(12) United States Patent
Saito et al.

(10) Patent No.: US 7,437,649 B2
(45) Date of Patent: Oct. 14, 2008

(54) DATA RECORDING METHOD AND DEVICE

(75) Inventors: Akiya Saito, Kanagawa (JP); Toru Aida, Kanagawa (JP); Yoriaki Kanada, Kanagawa (JP); Tatsushi Sano, Kanagawa (JP); Toshihiko Senno, Kanagawa (JP); Yoshinobu Usui, Kanagawa (JP); Yoichiro Sako, Tokyo (JP); Tatsuya Inokuchi, Tokyo (JP); Shunsuke Furukawa, Tokyo (JP); Yoshiro Miyoshi, Kanagawa (JP); Takashi Kihara, Chiba (JP)

(73) Assignee: Sony Corporation, Tokyo (JP)

( * ) Notice: Subject to any disclaimer, the term of this patent is extended or adjusted under 35 U.S.C. 154(b) by 757 days.

(21) Appl. No.: 10/489,619

(22) PCT Filed: Jul. 16, 2003

(86) PCT No.: PCT/JP03/09019

§ 371 (c)(1),
(2), (4) Date: Aug. 11, 2004

(87) PCT Pub. No.: WO2004/012190

PCT Pub. Date: May 2, 2004

(65) Prior Publication Data

US 2005/0086578 A1   Apr. 21, 2005

(30) Foreign Application Priority Data

Jul. 30, 2002   (JP)   ............................. 2002-220632

(51) Int. Cl.
*H03M 13/00* (2006.01)
(52) U.S. Cl. ...................................... 714/755; 714/769

(58) Field of Classification Search ................. 714/755, 714/756, 718, 6, 769, 759, 800, 803; 369/47.21, 369/47.19
See application file for complete search history.

(56) References Cited

U.S. PATENT DOCUMENTS

| 5,627,844 | A | * | 5/1997 | Cho ........................... 714/759 |
| 5,684,768 | A | * | 11/1997 | Terasaki et al. .......... 369/47.21 |
| 6,134,201 | A | * | 10/2000 | Sako et al. ................ 369/47.19 |
| 6,138,263 | A | * | 10/2000 | Kodama ...................... 714/769 |

(Continued)

FOREIGN PATENT DOCUMENTS

JP   9-128890   5/1997

(Continued)

*Primary Examiner*—Jacques Louis-Jacques
*Assistant Examiner*—Fritz Alphonse
(74) *Attorney, Agent, or Firm*—Oblon, Spivak, McClelland, Maier & Neustadt, P.C.

(57) ABSTRACT

Data is arranged to one block obtained after a CIRC process so that a predetermined data pattern is recorded into a predetermined portion on a disc. By tracing back an encoding step of a Cross-Interleave Reed-Solomon Code (CIRC), a layout of recording data of one block before the CIRC process for allowing the predetermined data pattern to be recorded into the predetermined portion is obtained. An error correcting process of a CD-ROM mode 1 is executed. If a position of a parity coincides with data for forming the predetermined data pattern, a value of user data of an encoding sequence to form the parity is changed. After error correction encoding of a CD-ROM is executed, encoding of the CIRC is executed to the recording data of one block.

10 Claims, 21 Drawing Sheets

U.S. PATENT DOCUMENTS

| | | | | |
|---|---|---|---|---|
| 6,144,743 A | * | 11/2000 | Yamada et al. | 380/44 |
| 6,430,701 B1 | * | 8/2002 | Takazawa | 714/6 |
| 6,687,860 B1 | * | 2/2004 | Iijima et al. | 714/718 |
| 6,718,505 B1 | * | 4/2004 | Kravtchenko et al. | 714/756 |

FOREIGN PATENT DOCUMENTS

| | | |
|---|---|---|
| JP | 2001-110136 | 4/2001 |
| JP | 2002-197810 | 7/2002 |

* cited by examiner

Fig. 6

| | | DATA BITS | | | | | | | | CHANNEL BITS | | | | | | | | | | | | | |
|---|---|---|---|---|---|---|---|---|---|---|---|---|---|---|---|---|---|---|---|---|---|---|---|
| | | d1 | · | · | · | · | · | · | d8 | d1 | · | · | · | · | · | · | · | · | · | · | · | · | c14 |
| 00 | 0 | 0 | 0 | 0 | 0 | 0 | 0 | 0 | 0 | 0 | 1 | 0 | 0 | 1 | 0 | 0 | 0 | 1 | 0 | 0 | 0 | 0 | 0 |
| 01 | 1 | 0 | 0 | 0 | 0 | 0 | 0 | 0 | 1 | 1 | 0 | 0 | 0 | 0 | 1 | 0 | 0 | 0 | 0 | 0 | 0 | 0 | 0 |
| 02 | 2 | 0 | 0 | 0 | 0 | 0 | 0 | 1 | 0 | 1 | 0 | 0 | 1 | 0 | 0 | 0 | 0 | 1 | 0 | 0 | 0 | 0 | 0 |
| 03 | 3 | 0 | 0 | 0 | 0 | 0 | 0 | 1 | 1 | 1 | 0 | 0 | 0 | 1 | 0 | 0 | 0 | 1 | 0 | 0 | 0 | 0 | 0 |
| ⋮ | ⋮ | | | | | ⋮ | | | | | | | | | | ⋮ | | | | | | | |
| 80 | 128 | 1 | 0 | 0 | 0 | 0 | 0 | 0 | 0 | 0 | 1 | 0 | 0 | 1 | 0 | 0 | 0 | 1 | 0 | 0 | 0 | 0 | 1 |
| 81 | 129 | 1 | 0 | 0 | 0 | 0 | 0 | 0 | 1 | 1 | 0 | 0 | 0 | 0 | 1 | 0 | 0 | 1 | 0 | 0 | 0 | 0 | 1 |
| 82 | 130 | 1 | 0 | 0 | 0 | 0 | 0 | 1 | 0 | 1 | 0 | 0 | 1 | 0 | 0 | 0 | 0 | 1 | 0 | 0 | 0 | 0 | 1 |
| 83 | 131 | 1 | 0 | 0 | 0 | 0 | 0 | 1 | 1 | 1 | 0 | 0 | 0 | 1 | 0 | 0 | 0 | 1 | 0 | 0 | 0 | 0 | 1 |
| ⋮ | ⋮ | | | | | ⋮ | | | | | | | | | | ⋮ | | | | | | | |
| 8C | 140 | 1 | 0 | 0 | 0 | 1 | 1 | 0 | 0 | 0 | 1 | 0 | 0 | 0 | 0 | 0 | 0 | 1 | 0 | 0 | 0 | 0 | 1 |
| ⋮ | ⋮ | | | | | ⋮ | | | | | | | | | | ⋮ | | | | | | | |
| 98 | 152 | 1 | 0 | 0 | 1 | 1 | 0 | 0 | 0 | 0 | 1 | 0 | 0 | 1 | 0 | 0 | 0 | 0 | 0 | 0 | 0 | 0 | 1 |
| ⋮ | ⋮ | | | | | ⋮ | | | | | | | | | | ⋮ | | | | | | | |
| B8 | 184 | 1 | 0 | 1 | 1 | 1 | 0 | 0 | 0 | 0 | 1 | 0 | 0 | 1 | 0 | 0 | 0 | 0 | 0 | 1 | 0 | 0 | 1 |
| ⋮ | ⋮ | | | | | ⋮ | | | | | | | | | | ⋮ | | | | | | | |
| BA | 186 | 1 | 0 | 1 | 1 | 1 | 0 | 1 | 0 | 1 | 0 | 0 | 1 | 0 | 0 | 0 | 0 | 0 | 0 | 1 | 0 | 0 | 1 |
| ⋮ | ⋮ | | | | | ⋮ | | | | | | | | | | ⋮ | | | | | | | |
| C9 | 201 | 1 | 0 | 1 | 1 | 1 | 0 | 0 | 0 | 1 | 0 | 0 | 0 | 0 | 1 | 0 | 0 | 0 | 0 | 0 | 0 | 0 | 1 |
| ⋮ | ⋮ | | | | | ⋮ | | | | | | | | | | ⋮ | | | | | | | |
| E2 | 226 | 1 | 0 | 1 | 1 | 1 | 0 | 1 | 0 | 1 | 0 | 0 | 0 | 0 | 1 | 0 | 0 | 0 | 1 | 0 | 0 | 1 | 0 |

Fig. 19

```
SY 81 B8 B8 B8 B8 B8 B8 B8 BA B8 BA B8 BA B8 8C 98 B4 8B BA B8 BABA B8 BABA B8 BA BA B8 BA B8 C9 E2 83 81
SY 81 B8 B8 B8 B8 B8 B8 B8 BA B8 BA B8 BA B8 8C 98 B4 8B BA B8 BABA B8 BABA B8 BA BA B8 BA B8 C9 E2 83 81
SY 81 B8 B8 B8 B8 B8 B8 B8 BA B8 BABABA B8 BABA 8C AA B4 92 BA B8 BABA B8 BABA B8 BA BA B8 BA B8 C9 E2 83 81
SY 81 B8 B8 B8 B8 B8 B8 B8 BA B8 B8 BA AA AA BB 92 BA B8 BABA B8 BA B8 BABA B8 BA B8 C9 E2 83 81
SY 81 B8 B8 B8 B8 B8 B8 B8 BA B8 B8 BA AA AA BB 92 BA B8 BABA B8 BA B8 BABA B8 BA B8 C9 E2 83 81
SY 81 B8 B8 B8 B8 B8 B8 B8 BA B8 B8 B8 AA 98 BB 8B BA B8 BABA B8 BA B8 BABA B8 BA B8 C9 E2 83 81
SY 81 B8 B8 B8 B8 B8 B8 B8 BA B8 BA B8 BA B8 8C 98 B4 8B BA B8 BABA B8 BABA B8 BA BA B8 B8 C9 E2 83 81
```

DATA RECORDING METHOD AND DEVICE

TECHNICAL FIELD

The invention relates to a data recording method and an apparatus for recording data onto a recording medium such as a disc of a CD-ROM (Compact Disc Read Only Memory) and, more particularly, to a data recording method and an apparatus for recording a predetermined data pattern into a predetermined portion of a recording medium, thereby identifying the recording medium and preventing a copy thereof.

BACKGROUND ART

It is considered to record a predetermined data pattern into a predetermined portion of a CD-ROM disc, thereby identifying the disc and preventing a copy-thereof. In the case of recording the predetermined data pattern into the predetermined portion of the disc as mentioned above, it is considered to replace the data in the predetermined portion of the disc with the predetermined data pattern. However, since error correction encoding has been performed in the CD-ROM, if the data in the predetermined portion of the disc is replaced with the predetermined data pattern, a trouble occurs in an error correcting process.

It is, therefore, considered to arrange data corresponding to the predetermined data pattern into the recording data of one block. That is, the data which is recorded into the CD-ROM is modulated from 8 bits to 14 bits by EFM modulation. Merging bits of 3 bits are added to suppress a DC component. It is considered to arrange the corresponding recording data in a manner such that when the data is EFM (8 to 14 Modulation) modulated and DC component suppression bits are added and the resultant data is recorded onto the disc, a predetermined pattern is obtained.

However, the data in the CD-ROM is subjected to an error correction encoding process of a CD-ROM mode 1 and the data is further interleaved by a CIRC (Cross-Interleave Reed-Solomon Code) and error correction encoded. Therefore, the recording data of one block is dispersed and recorded onto the disc. Thus, if the corresponding data is arranged in the recording data of one block so that the predetermined data pattern is recorded into the predetermined portion, the corresponding data is dispersed and arranged into each frame before a CIRC process. Although a method whereby the recording data corresponding to the predetermined data pattern which is recorded into the predetermined portion of the disc is dispersed into each frame of the recording data can be obtained on the basis of the interleave of a CIRC system, a correspondence relation between them is complicated.

Data such as sync, header, all "0", and the like exists in the data of one block as a recording unit of the CD-ROM. Those data cannot be changed. An error detection code and a parity for error correction cannot be determined before the data is recorded.

When the data corresponding to the predetermined data pattern is dispersed and arranged into the recording data of one block so that the predetermined data pattern is arranged into the predetermined portion on the disc of the CD-ROM, there is a case where the data corresponding to the predetermined data pattern becomes a position of auxiliary data such as sync, header, parity, or the like. Particularly, since the parity exists among a few frames in one block, it is difficult to avoid a situation such that when the corresponding data is dispersed and arranged in the data of one block so that the predetermined data pattern is arranged into the predetermined portion, the corresponding data coincides with the position of the parity. According to such a method, consequently, it is difficult to record the predetermined data pattern into the predetermined portion on the disc without causing a problem in the error correcting process.

DISCLOSURE OF INVENTION

It is, therefore, an object of the invention to provide a data recording method and an apparatus which can record a predetermined data pattern into a predetermined portion of a recording medium and prevent an influence from being exerted on an error correcting process.

To solve the above problems, according to the invention, there is provided a data recording method whereby an error correction encoding process by a first error correction encoding process is executed to data of a predetermined block, further, an error correction encoding process by a second error correction encoding process is executed, and the data is recorded onto a recording medium, comprising the steps of: arranging data corresponding to a predetermined data pattern onto a block obtained after the second error correction encoding process so that the predetermined data pattern is recorded into a predetermined portion on the recording medium; arranging the data corresponding to the predetermined data pattern arranged on the block obtained after the second error correction encoding process onto a block before the second error correction encoding process by tracing back the processing step of the second error correction encoding process; executing the first error correction encoding process to the data arranged on the block before the second error correction encoding process; in the first error correction encoding processing step, if a position of a parity coincides with a position of the data corresponding to the predetermined data pattern, the parity is set to a value of the data corresponding to the predetermined data pattern, and a value of a part of data of an encoding sequence for forming the parity is changed so as to satisfy a function of an error correction code; executing the second error correction encoding process to the data of the block to which the first error correction encoding process has been executed; and recording the data to which the first error correction encoding process has been executed and, further, the second error correction encoding process has been executed onto the recording medium.

According to the invention, there is provided a data recording apparatus in which an error correction encoding process by a first error correction encoding process is executed to data of a predetermined block, further, an error correction encoding process by a second error correction encoding process is executed, and the data is recorded onto a recording medium, comprising: means for arranging data corresponding to a predetermined data pattern onto a block obtained after the second error correction encoding process so that the predetermined data pattern is recorded into a predetermined portion on the recording medium; means for arranging the data corresponding to the predetermined data pattern arranged on the block obtained after the second error correction encoding process onto a block before the second error correction encoding process by tracing back a processing step of the second error correction encoding process; means for executing the first error correction encoding process to the data arranged on the block before the second error correction encoding process; in the means for executing the first error correction encoding process, if a position of a parity coincides with a position of the data corresponding to the predetermined data pattern, the parity is set to a value of the data corresponding to the predetermined data pattern, and a value of a part of data of an encoding sequence for forming the parity is changed so as to satisfy a function of an error correction code; means for executing the second error correction encoding process to the data of the block to which the first error correction encoding process has been executed; and means for recording the data to which the first error correction encoding process has been executed and, further, the second error correction encoding process has been executed onto the recording medium.

According to the invention, a CD-ROM is used as a recording medium. In the CD-ROM, the error correction encoding process by the first error correction encoding process (error correction encoding process of the CD-ROM mode 1) is executed to the data of a predetermined block and, further, the error correction encoding process is executed by the second error correction encoding process (CIRC).

First, the data corresponding to one block after the process of the CIRC is arranged so that the predetermined data pattern is recorded into the predetermined portion on the disc and the encoding process of the CIRC is traced back, thereby obtaining a layout of the recording data of one block before interleaving for allowing the predetermined data pattern to be recorded into the predetermined portion and executing an error correcting process of the CD-ROM. If the position of the parity coincides with the data corresponding to the predetermined data pattern, the parity is set to the value of the data corresponding to the predetermined data pattern, a part of the value of user data of an encoding sequence which forms the parity is changed so as to satisfy the function of the error correction code. After the error correction encoding of the CD-ROM is executed as mentioned above, the encoding of the CIRC is executed to the recording data of one block and the encoded data is EFM modulated and recorded onto the disc. According to the invention, if the position of the parity coincides with the data corresponding to the predetermined data pattern, the parity is set to the value of the data corresponding to the predetermined data pattern, and a part of the value of the user data of the encoding sequence which forms the parity is changed so as to satisfy the function of the error correction code. Therefore, the predetermined data pattern can be recorded into the predetermined portion and the error correction encoding process is not influenced.

BRIEF DESCRIPTION OF DRAWINGS

FIG. 6 is a schematic diagram of an example of a conversion table of an EFM modulation.

FIG. 19 is a schematic diagram for use in explanation of a pattern in which a DSV increases.

BEST MODE FOR CARRYING OUT THE INVENTION

An embodiment of the invention will now be described hereinbelow with reference to the drawings. In the invention, a disc of a CD-ROM is used as a recording medium. In the CD-ROM, a block (sector) consisting of 98 frames is used as a unit for recording and reproduction.

Prior to explaining the embodiment of the invention, processes regarding a recording system of the CD-ROM, that is, processes such as error correction encoding by the CIRC, EFM modulation, error correcting process of the CD-ROM mode 1, and the like which are used in a CD will be simply explained in order to enable the embodiment of the invention to be easily understood.

Figure 1:
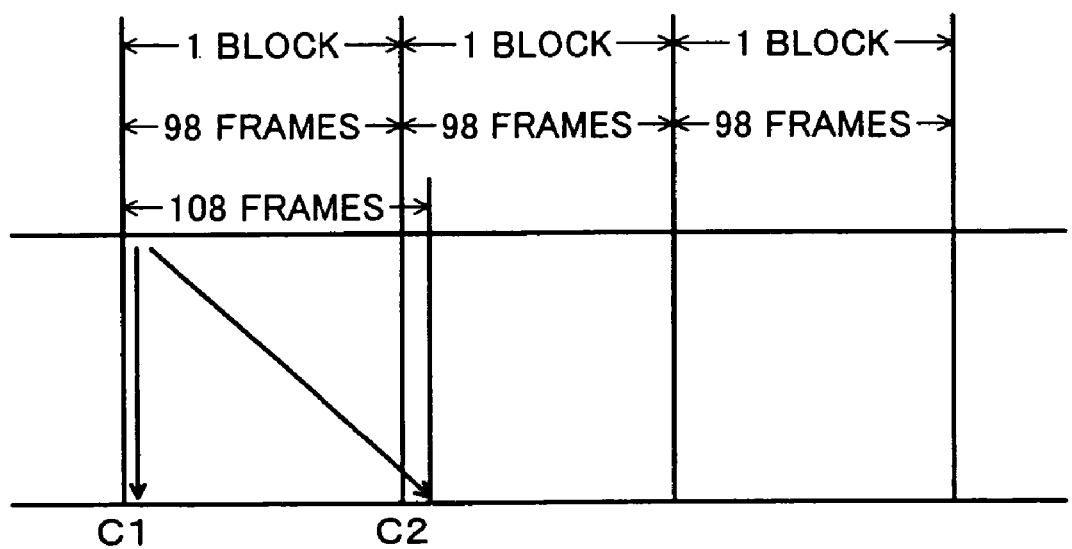
FIG. 1 is a schematic diagram for use in explanation of a CIRC.

In the CD, the error correction encoding by the CIRC is used. As shown in FIG. 1, in the CIRC, the error correction encoding is executed in the vertical direction in a C1 sequence and the error correction encoding is executed in the oblique direction in a C2 sequence. Thus, in the CIRC system, interleaving of up to 108 frames is executed. Data which has been error correction encoded by the CIRC system is EFM modulated and recorded onto the disc. 98 frames are set to one block. In the CD-ROM, this block is set to a recording unit of the data.

Figure 2:
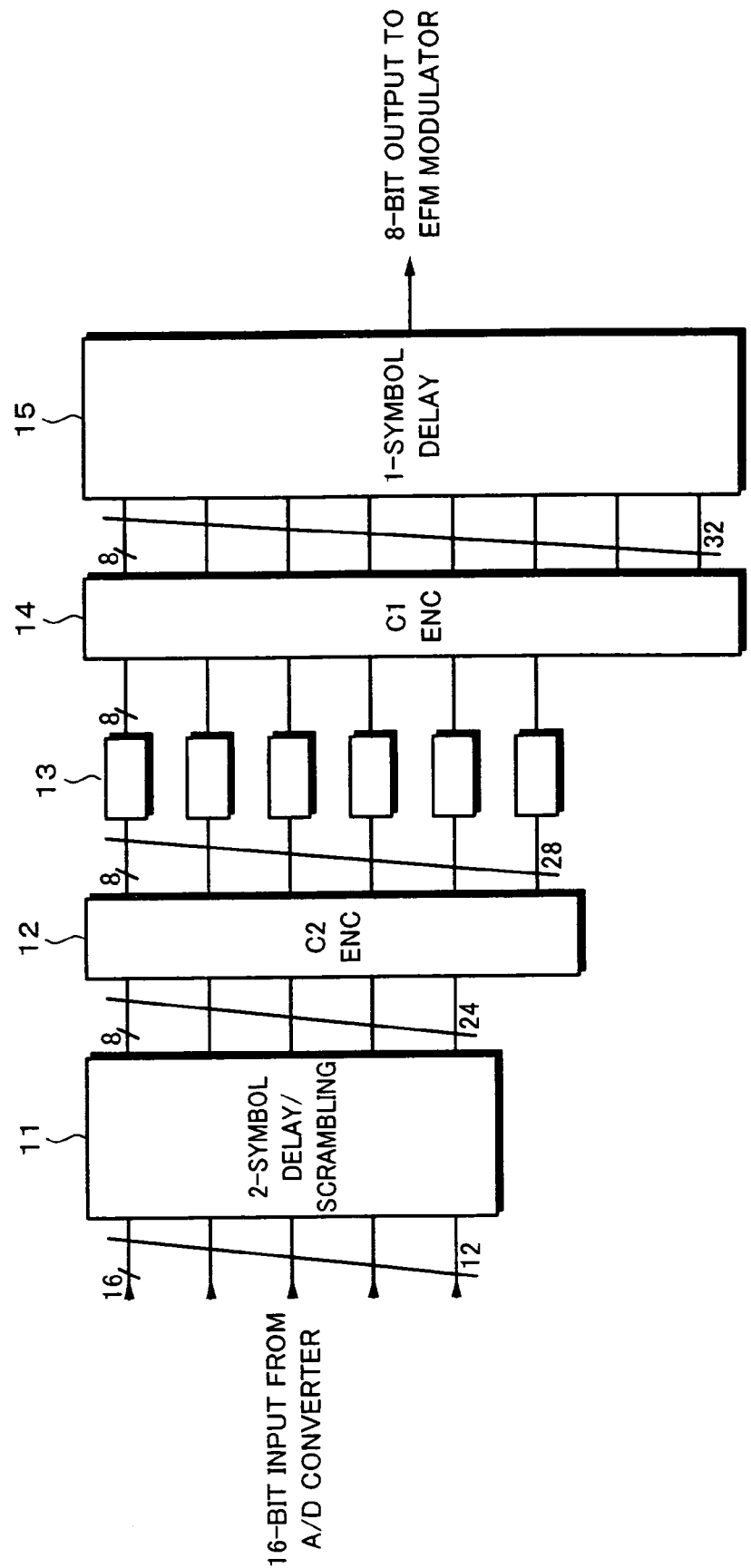
FIG. 2 is a block diagram for use in explanation of an encoding process of the CIRC.
Figure 3:
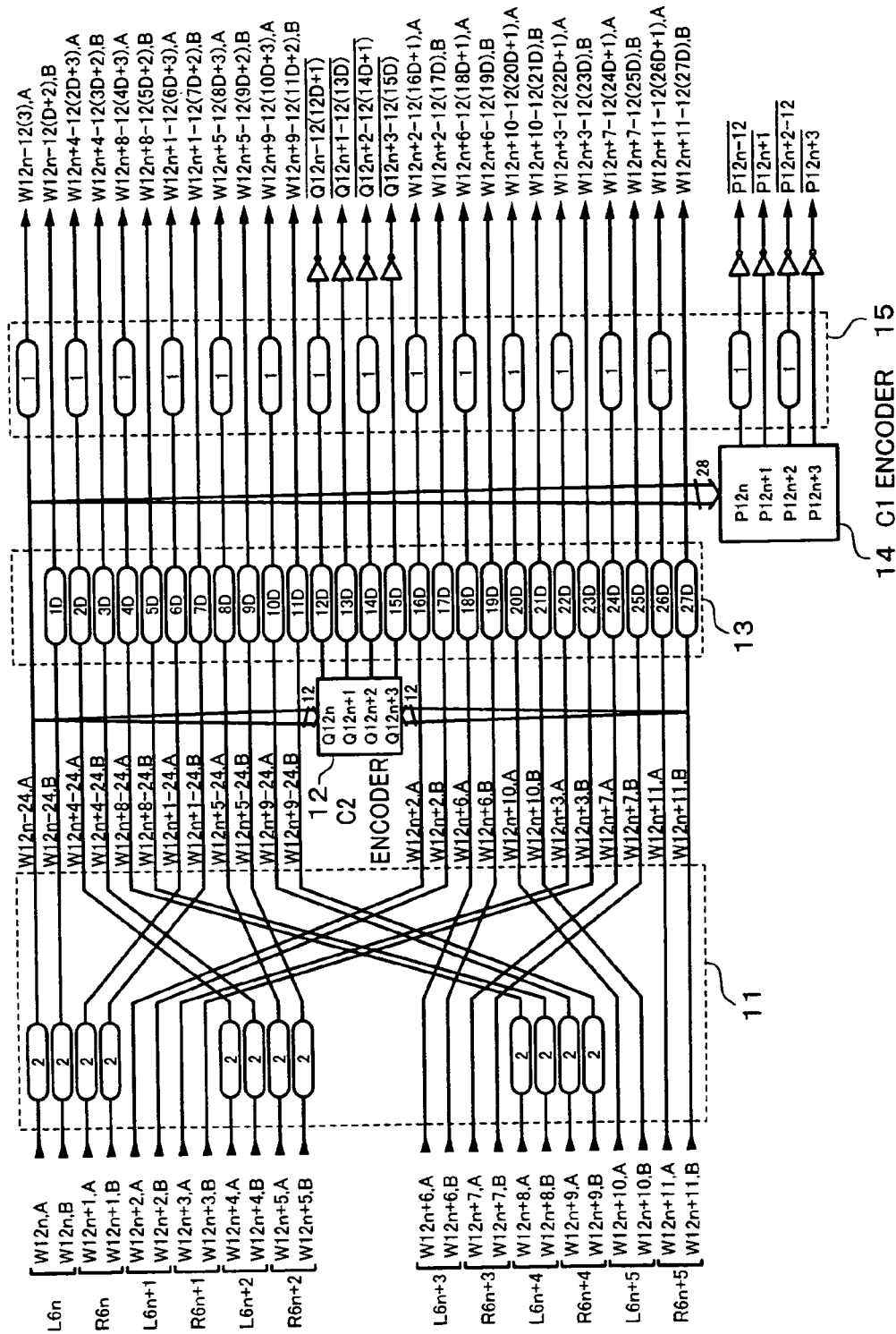
FIG. 3 is a block diagram for use in explanation of the encoding process of the CIRC.

FIGS. 2 and 3 are block diagrams shown along a flow of encoding of the CIRC system. In an explanation of the encoding/decoding of the CIRC, the encoding of audio data is used as a target for the purpose of easily understanding.

In an audio data which is encoded, one word (16 bits) is divided into upper 8 bits and lower 8 bits and inputted as 24 symbols (1 symbol is equal to 1 byte). 24 symbols correspond to the data of one frame upon recording.

The inputted 24 symbols (W12n,A, W12n,B, . . . , W12n+11,A, W12n+11,B) (upper 8 bits are shown by A, lower 8 bits are shown by B) are supplied to a 2-symbol delay/scrambling circuit 11. The 2-symbol delay is executed to data L6n, R6n, L6n+2, R6n+2, . . . . Even if all relevant sequences become an error in a C2 encoder 12, they can be interpolated. The scrambling is executed so that the maximum burst error interpolation length can be obtained.

An output from the 2-symbol delay/scrambling circuit 11 is supplied to the C2 encoder 12. The C2 encoder 12 executes encoding of a (28, 24, 5) Reed-Solomon Code on $GF(2^8)$ and generates a C2 parity Q12n, Q12n+1, Q12n+2, and Q12n+3 of 4 symbols.

28 symbols of the output of the C2 encoder 12 is supplied to interleaving circuits 13. Assuming that a unit delay amount is set to D (D: frame delay), the interleaving circuits 13 give a delay amount which changes arithmetically like 0, D, 2D, ... to the symbols, respectively, thereby changing a first layout of the symbols to a second layout.

An output of the interleaving circuit 13 is supplied to a C1 encoder 14. A (32, 28, 5) Reed-Solomon Code on $GF(2^8)$ issued as a C1 code. A C1 parity P12n, P12n+1, P12n+2, and P12n+3 of 4 symbols is generated from the C1 encoder 14. The minimum distance of each of the C1 code and the C2 code is equal to 5. Therefore, correction of a 2-symbol error and extinction correction of a 4-symbol error (in the case where the positions of the error symbols have been known) can be made.

32 symbols from the C1 encoder 14 are supplied to a 1-symbol delay circuit 15. The 1-symbol delay circuit 15 is provided to separate the adjacent symbols, thereby preventing the 2-symbol error from occurring due to errors existing over a boundary between the symbols. Although the parity has been inverted by an inverter, this is because even when all data and parities are equal to zero, it is enabled to detect the errors.

Figure 4:
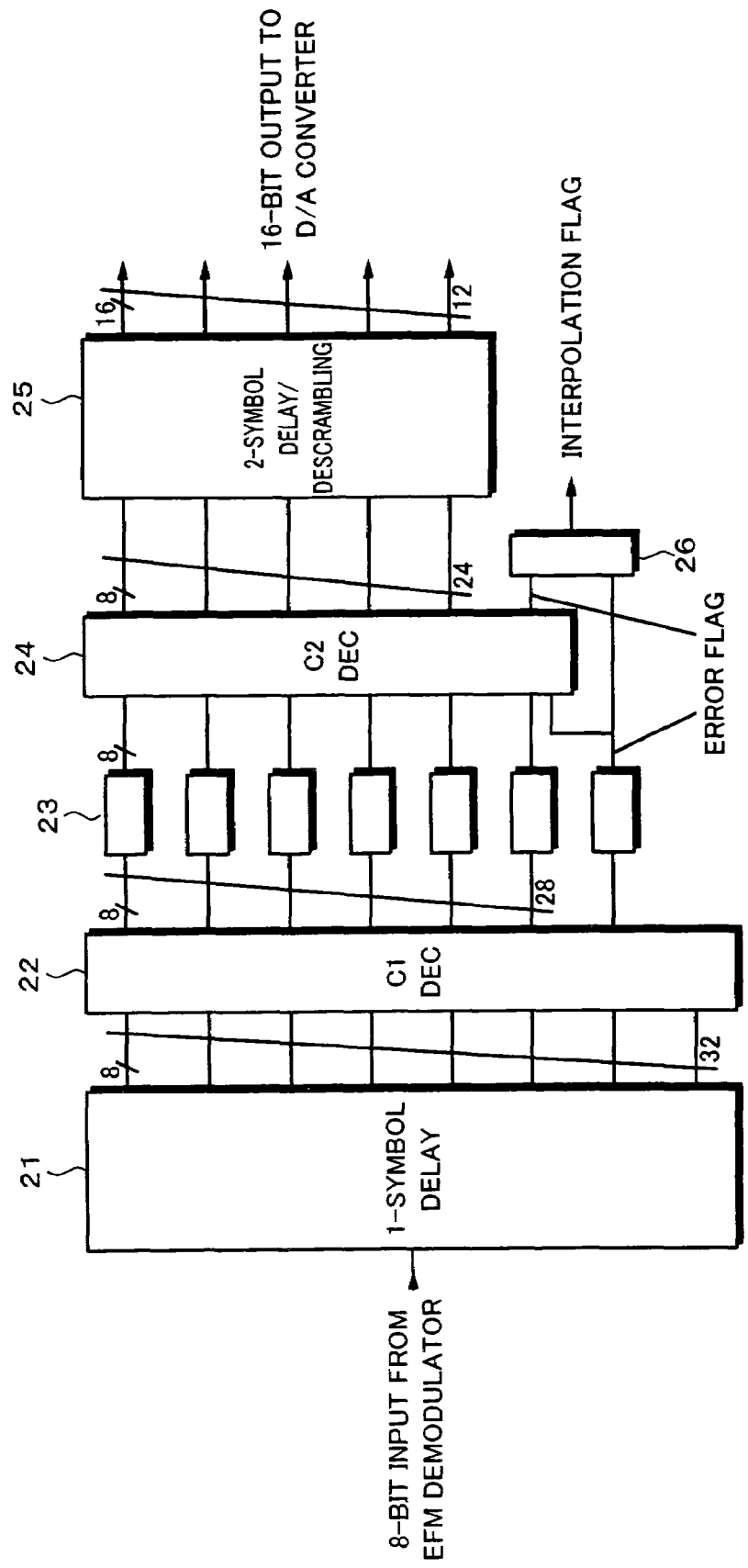
FIG. 4 is a block diagram for use in explanation of a decoding process of the CIRC.
Figure 5:
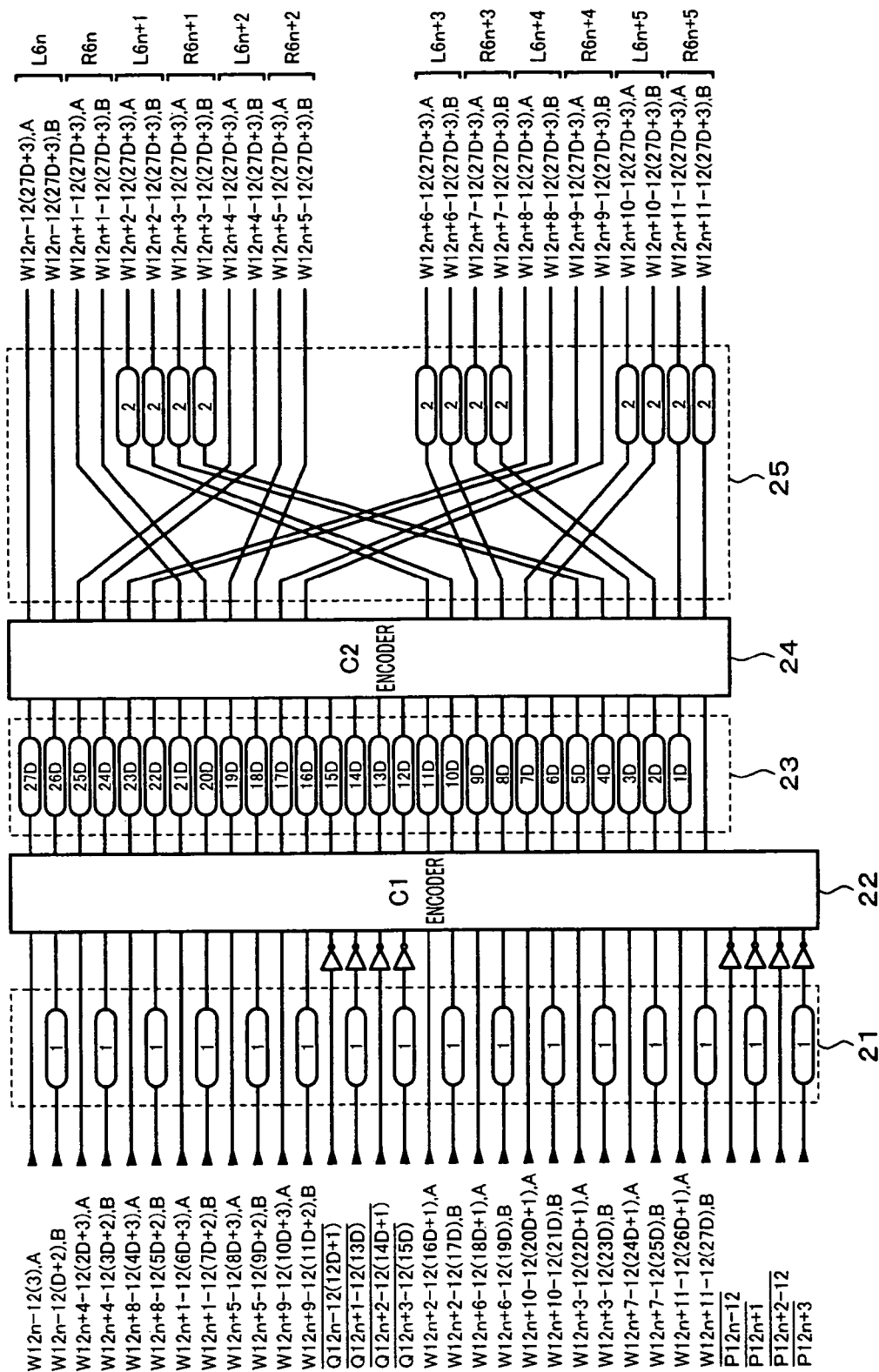
FIG. 5 is a block diagram for use in explanation of the decoding process of the CIRC.

FIGS. 4 and 5 are block diagrams shown along a flow of decoding of the CIRC system. The decoding process is executed in order opposite to that of the foregoing encoding process.

First, reproduction data from an EFM demodulating circuit is supplied to a 1-symbol delay circuit 21. The delay given by the 1-symbol delay circuit 15 on the encoding side is cancelled in the circuit 21.

32 symbols from the 1-symbol delay circuit 32 are supplied to a C1 decoder 22. An output of the C1 decoder 22 is supplied to deinterleaving circuits 23. The deinterleaving circuits 23 give a delay amount which changes arithmetically like 27D, 26D, ..., D, 0 to the 28 symbols so as to cancel the delay amount given by the interleaving circuit 13, respectively.

An output of the deinterleaving circuit 23 is supplied to a C2 decoder 24 and decoding of the C2 code is performed. An output of 24 symbols of the C2 decoder 24 is supplied to a 2-symbol delay/descrambling circuit 25. Decoding data of 24 symbols is obtained from the circuit 25.

An interpolation flag is formed by an interpolation flag forming circuit 26 from error flags from the C1 decoder 22 and C2 decoder 24. The data indicative of an error is interpolated by this interpolation flag.

As mentioned above, according to the CIRC system, the error correcting encoding is executed in two directions of the C1 sequence and the C2 sequence. The interleaving of up to 108 frames is executed by the CIRC system.

In the CD, an EFM modulation system is used. In the EFM modulation, each symbol (8 data bits) is converted into 14 channel bits. FIG. 6 shows an example of a part of a conversion table of EFM. In FIG. 6, data bits d1 to d8 of 8 bits are converted into channel bits c1 to c14 of 14 bits. A minimum time width (time width in which the number of 0 between 1 and 1 of the recording signal is minimum) Tmin of the EFM modulation is equal to 3T. A pit length corresponding to 3T is equal to 0.87 μm. The pit length corresponding to 3T is the shortest pit length. Merging bits (also referred to as coupling bits) of 3 bits are arranged between the 14 channel bits and the 14 channel bits.

Figure 7:
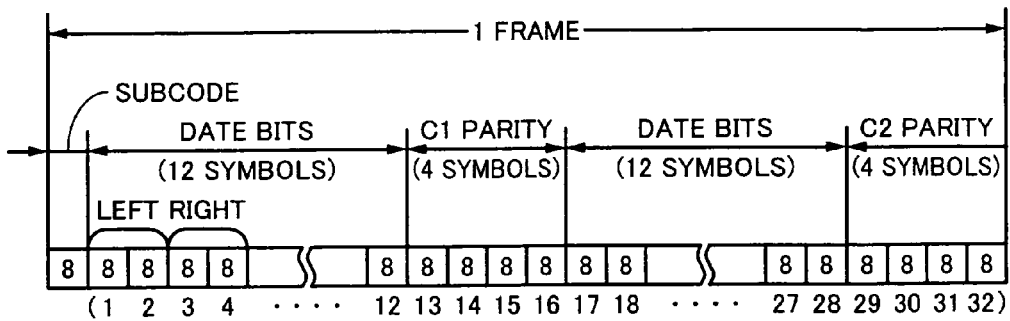
FIG. 7 is a schematic diagram for use in explanation of data of one frame.

As mentioned above, in the case where the audio data is sampled by 16 bits, 24 symbols corresponding to 6 samples of each of L (left) and R (right) channels are arranged in one frame. Therefore, as shown in FIG. 7, the data of one frame comprises: data bits of 24 symbols; the C1 parity of 4 symbols; the C2 parity of 4 symbols; and a subcode of 1 symbol. In the data of one frame which is recorded onto the disc, 8 bits are converted into 14 bits by the EFM modulation and the merging bits are added to the data. Further, a frame sync data pattern is added to the head of the frame. Assuming that a period of the channel bits is set to T, the frame sync data pattern is a data pattern in which 11T, 11T, and 2T continue. Since such a data pattern is not caused according to an EFM modulation rule, a frame sync can be detected by a unique data pattern.

Therefore, one frame which is recorded onto the disc is constructed by

| | |
|---|---|
| frame sync: | 24 channel bits |
| data bits: | 14 × 24 = 336 channel bits |
| subcode: | 14 channel bits |
| parity: | 14 × 8 = 112 channel bits |
| merging bits: | 3 × 34 = 102 channel bits |

Therefore, the total number of channel bits of one frame is equal to 588 channel bits. A frame frequency is set to 7.35 kHz.

A set of 98 frames is called a block. A block expressed by rearranging the 98 frames so as to continue in the vertical direction comprises: a frame sync portion to identify the head of the block; a subcode portion; data; and a parity portion. The subcode frame corresponds to 1/75 second of a reproducing time of the ordinary CD.

Figure 8:
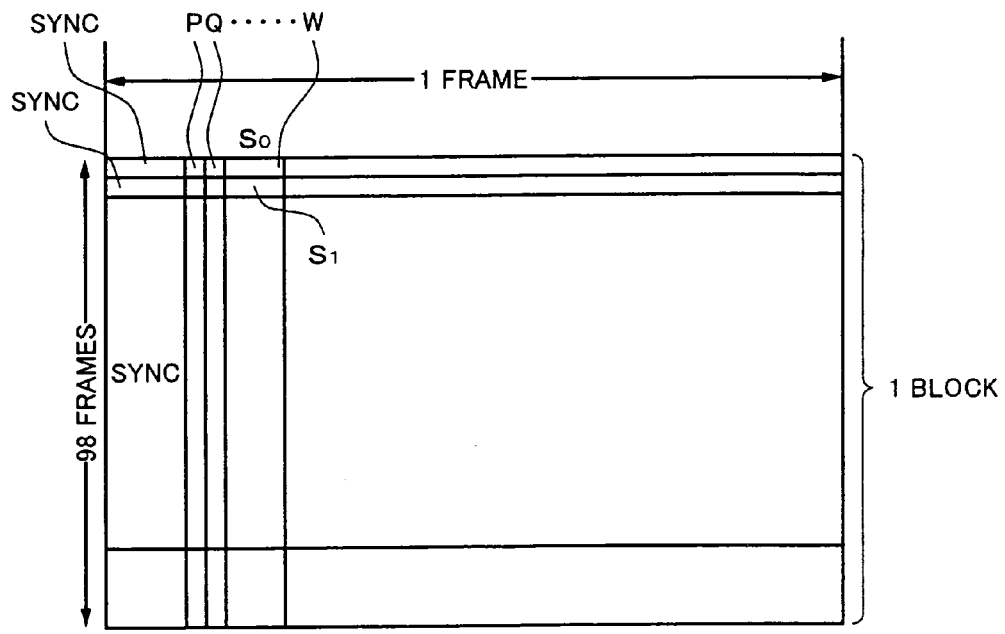
FIG. 8 is a schematic diagram for use in explanation of the data of one block.

FIG. 8 shows a construction of one block at the time of recording data onto the disc. When the data is recorded onto the disc, a subcode of one symbol is added to each frame. The subcode includes one bit of each of eight channels P to W. The subcodes of head 2 frames of 98 frames are subcode frame syncs S0 and S1. In the case of recording the data of an optical disc by a CD-ROM or the like, 98 frames (2,352 bytes) as a unit in which the subcode is completed are set to one block.

Each of the head 2 frames in the subcode portion is a sync data pattern of the subcode frame and a data pattern of "out of rule" of EFM. The bits in the subcode portion construct the P, Q, R, S, T, U, V, and W channels.

The R to W channels are used for a special application such as still image, character display of what is called KARAOKE, or the like. The P and Q channels are used for the track position control operation of a pickup upon reproduction of the digital data recorded on the disc.

The P channel is used to record a "0" signal in what is called a lead-in area locating in a disc inner circumference portion and to record a signal in which "0" and "1" are repeated at a predetermined period in what is called a lead-out area locating in a disc outer circumference portion. The P channel is also used to record a signal which is set to "1" showing an interval between music pieces and "0" showing other portion in a program area locating between the lead-in area and the lead-out area of the disc. Such a P channel is provided to search for the head of each music piece upon reproduction of the digital audio data recorded on the CD.

The Q channel is provided to enable finer control upon reproduction of the digital audio data recorded on the CD. A structure of one subcode frame of the Q channel is constructed by: a sync bit portion; a control bit portion; an address bit portion; a data bit portion; and a CRC bit portion.

In the CD-ROM, the block comprising the 98 frames is set to a unit for recording and reproduction. The block is also called a sector. A size of one block is equal to 2352 bytes as mentioned above.

Figure 9A:
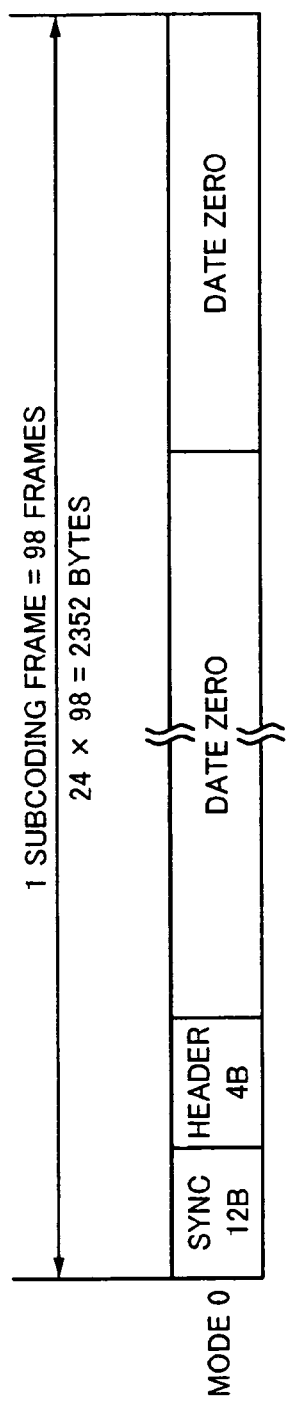
FIGS. 9A to 9C are schematic diagrams for use in explanation of a recording format of a CD-ROM.
Figure 9B:
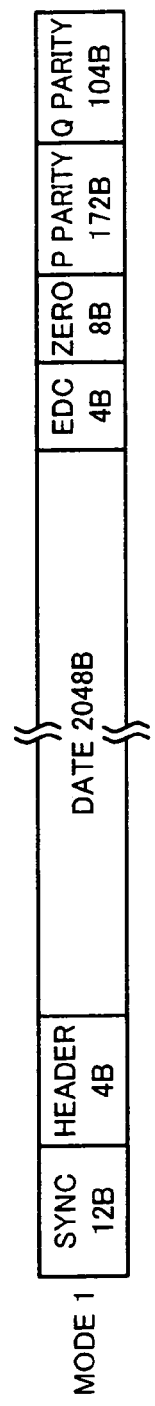
Figure 9C:
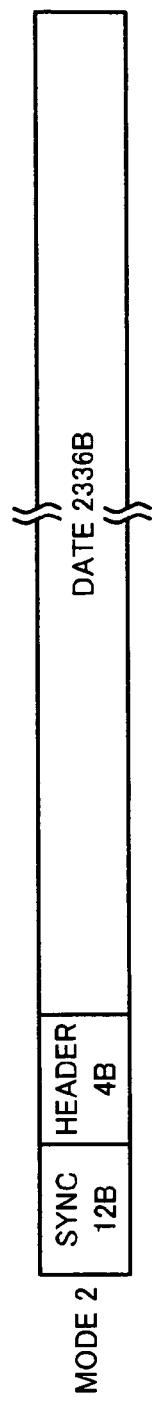

As shown in FIGS. 9A to 9C, there are a mode 0, a mode 1, and a mode 2 as formats of the CD-ROM. A sync (sync bits) of 12 bytes to divide the block are arranged at the head of each block. Subsequently, a header of 4 bytes is arranged. A block address and a mode are arranged in the header.

As shown in FIG. 9A, the mode 0 is used as a dummy block in the case of equalizing the lead-in portion and the lead-out portion with the CD-ROM structure. In the format of the mode 1, the sync of 12 bytes, the header of 4 bytes, and data of 2336 bytes are arranged. The data of 2336 bytes is the data of all "0".

As shown in FIG. 9B, in the mode 1, error correcting ability is raised by the auxiliary data and suitable for recording data which needs reliability. In the mode 1, the sync of 12 bytes, the header of 4 bytes, user data of 2048 bytes, and the auxiliary data of 288 bytes are arranged. The auxiliary data comprises: an error detecting code (EDC) of 4 bytes; data of 0 of 8 bytes; a P parity of 172 bytes; and a Q parity of 104 bytes.

As shown in FIG. 9C, in the mode 2, the additional error correction code is not arranged but all data after the header can be used as user data. The mode 2 is used in the case of handling data whose errors can be corrected by the interpolating process like audio data or image data. In the mode 2, the sync of 12 bytes, the header of 4 bytes, and user data of 2336 bytes are arranged.

As shown in FIG. 9B, in the mode 1 of the CD-ROM, the error correction code is added to the data of one block in order to improve the reliability.

Figure 10:
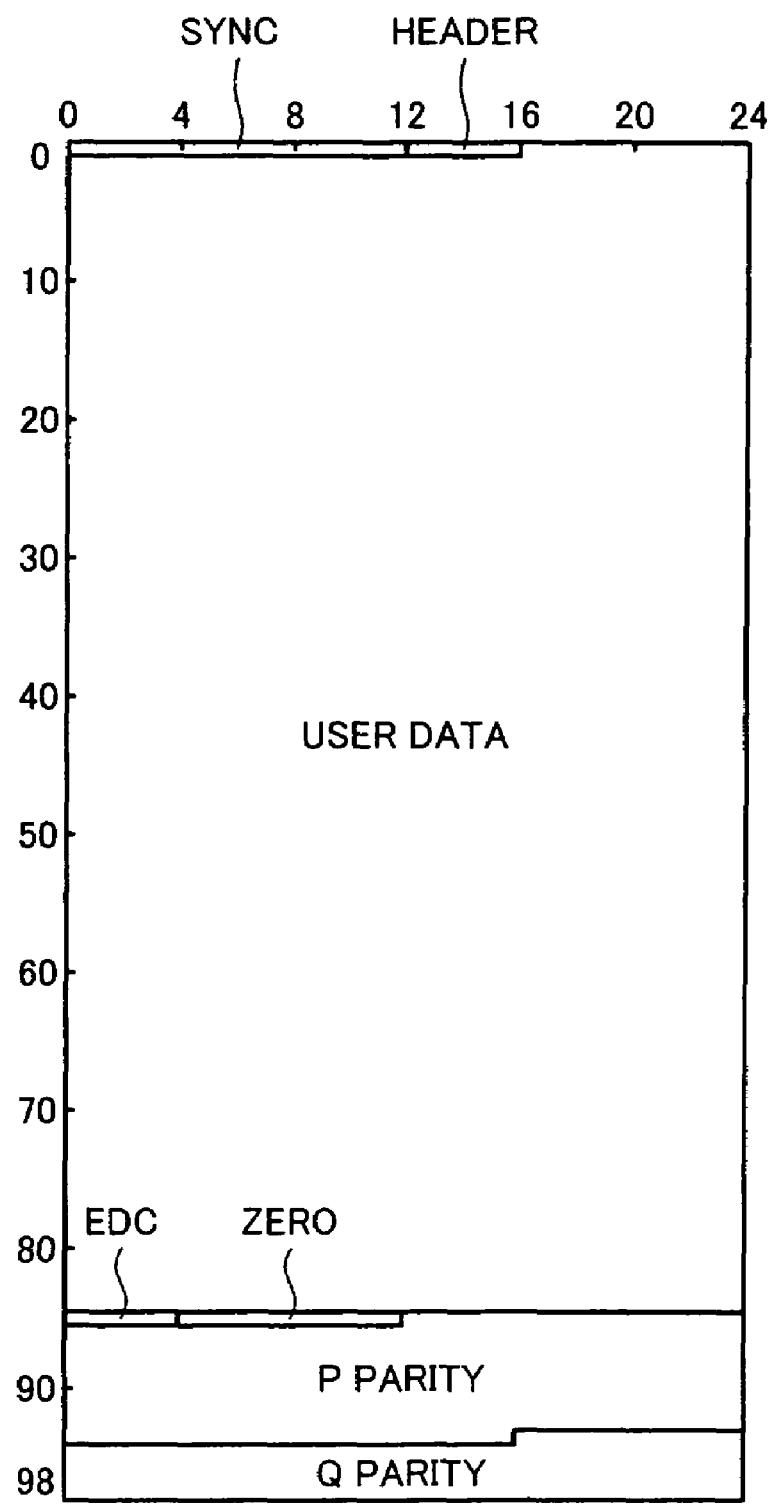
FIG. 10 is a schematic diagram for use in explanation of a layout of recording data of one block of the CD-ROM before a CIRC process.

FIG. 10 shows recording data (data before the process by the CIRC is executed) of one block in the mode 1 of the CD-ROM. As mentioned above, one block consists of 98 frames. The sync of 12 bytes and the header of 4 bytes are arranged in the first frame. The user data of 2048 bytes is subsequently arranged. The error detecting code (EDC) of 4 bytes, the data of all "0" of 8 bytes, the P parity of 172 bytes, and the Q parity of 104 bytes are arranged as auxiliary data.

The error detecting code in the CD-ROM mode 1 is defined for a length of 2340 bytes from the header portion. This error correction encoding sequence is added to two directions of the P sequence and the Q sequence. Each error correction code is a product code of the Reed-Solomon Code defined by $GF(2^8)$. The P sequence is a (26, 24, 3) Reed-Solomon Code. The Q sequence is a (45, 43, 3) Reed-Solomon Code. The correction of one byte or the detection of the 2-byte error can be performed per sequence by the P sequence or the Q sequence.

Figure 11:
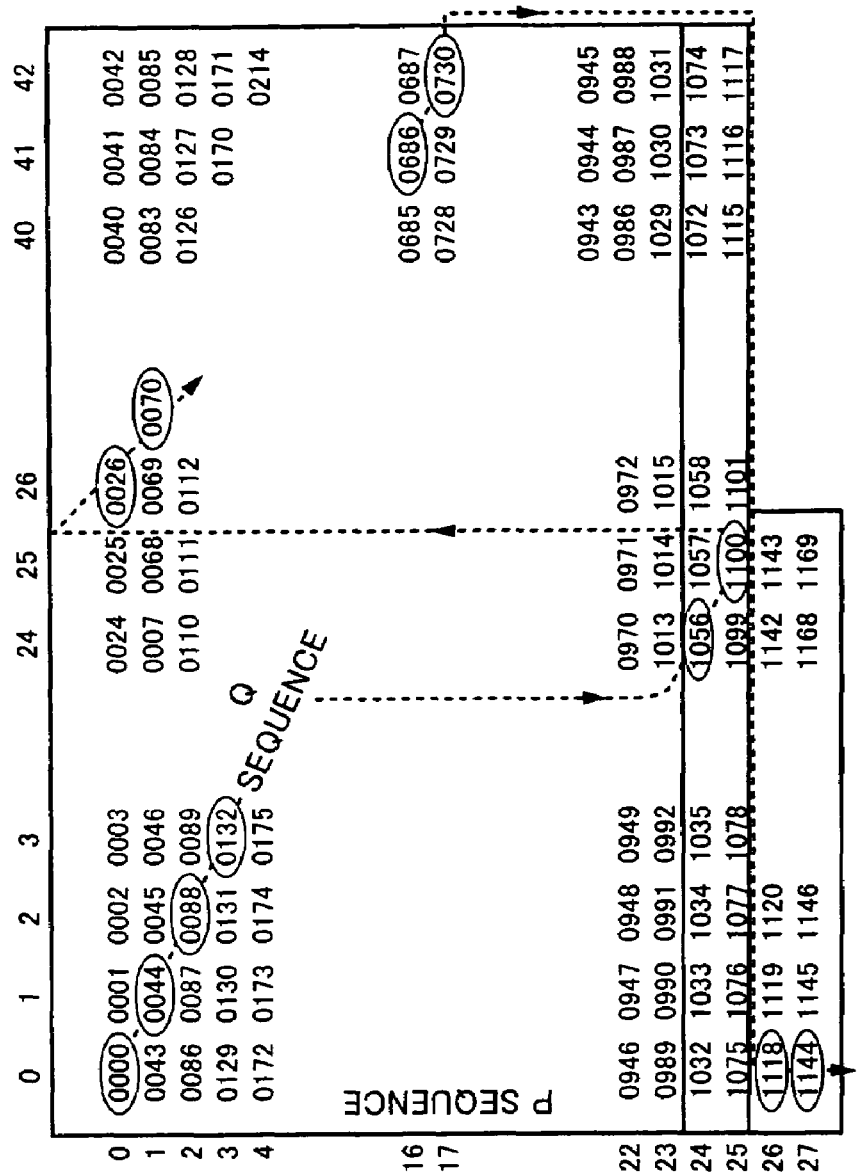
FIG. 11 is a schematic diagram for use in explanation of an error correction encoding process of the CD-ROM.

The error correction code is encoded to the data of 16 bits by a construction as shown in FIG. 11 by dividing into two portions each consisting of 8 bits on the LSB side and the MSB side. For example, the bytes of "minutes" of the header and "block" are separated to the portion on the LSB side and the bytes of "seconds" and "mode" are separated to the portion on the MSB side. Thus, each portion is constructed by 1170 bytes and the P sequence and the Q sequence are interleaved as shown in FIG. 11. The P sequence and the Q sequence can be expressed as follows.

$$P = i + 43j \ (i=0 \text{ to } 43, j=0 \text{ to } 25)$$

$$Q = 43i + 44j \bmod 1118 \ (i=0 \text{ to } 25, j=0 \text{ to } 42)$$

The error detecting code (EDC) in the code is used to check the error of the data upon reproduction after the error correction was used. The error detecting code is a CRC (Cyclic Redundancy Check) code and effective to 2064 bytes in total of the sync, header, and data.

Figure 12:
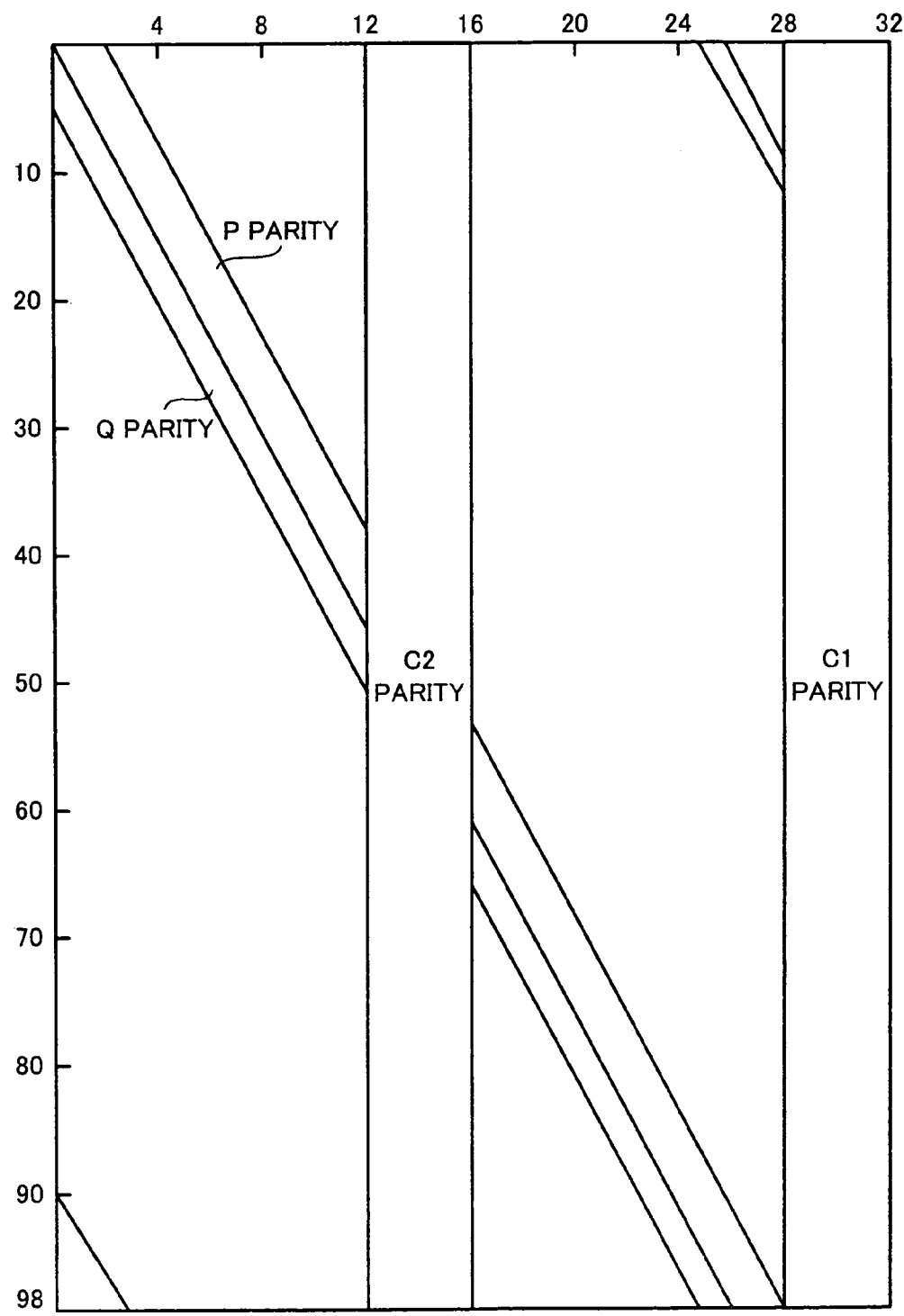
FIG. 12 is a schematic diagram for use in explanation of a layout of recording data of one block of the CD-ROM after the CIRC process.

When the recording data of one block shown in FIG. 10 is recorded onto the disc, the interleaving is executed by the CIRC system and the error correction code is added as mentioned above. Thus, the recording data of one block arranged as shown in FIG. 10 is distributed as shown in FIG. 12. As shown in FIG. 12, the P parity and the Q parity are distributed in the oblique direction by the interleaving of the CIRC. Although not shown, the user data, the sync, the header, the EDC, and the portion of all "0" are also distributed by the interleaving of the CIRC.

It is considered to record a predetermined data pattern into a predetermined portion of the disc of the CD-ROM constructed as mentioned above in order to identify the disc and prevent the copy. In this case, although it is considered to simply replace the data in the predetermined portion of the disc of the CD-ROM with the predetermined data pattern, in the CD-ROM mode 1, the error correction encoding has been performed. If the data in the predetermined portion of the disc is simply replaced with the predetermined data pattern, the error correcting process will be obstructed. The data of the parity exists in the data of one block and the data of the parity cannot be predetermined.

Therefore, in the recording method to which the invention is applied, the data corresponding to one block (FIG. 12) obtained after the interleaving is arranged so that the predetermined data pattern is recorded into the predetermined portion on the disc and the encoding step of the CIRC is traced back, thereby obtaining the layout of the recording data of one block (FIG. 10) before the interleaving for allowing the predetermined data pattern to be recorded into the predetermined portion and executing the error correcting process of the CD-ROM.

If the position of the parity coincides with the data corresponding to the predetermined data pattern, the parity is set to the value of the data corresponding to the predetermined data pattern and a part of the value of the user data of the encoding sequence to form the parity is changed. After that, the error correction encoding of the CD-ROM is executed, the encoding of the CIRC is executed to the recording data of one block, the EFM modulation is executed, and the resultant data is recorded onto the disc. Thus, the predetermined data pattern can be recorded into the predetermined portion and the error correction encoding process is not influenced.

Figure 13:
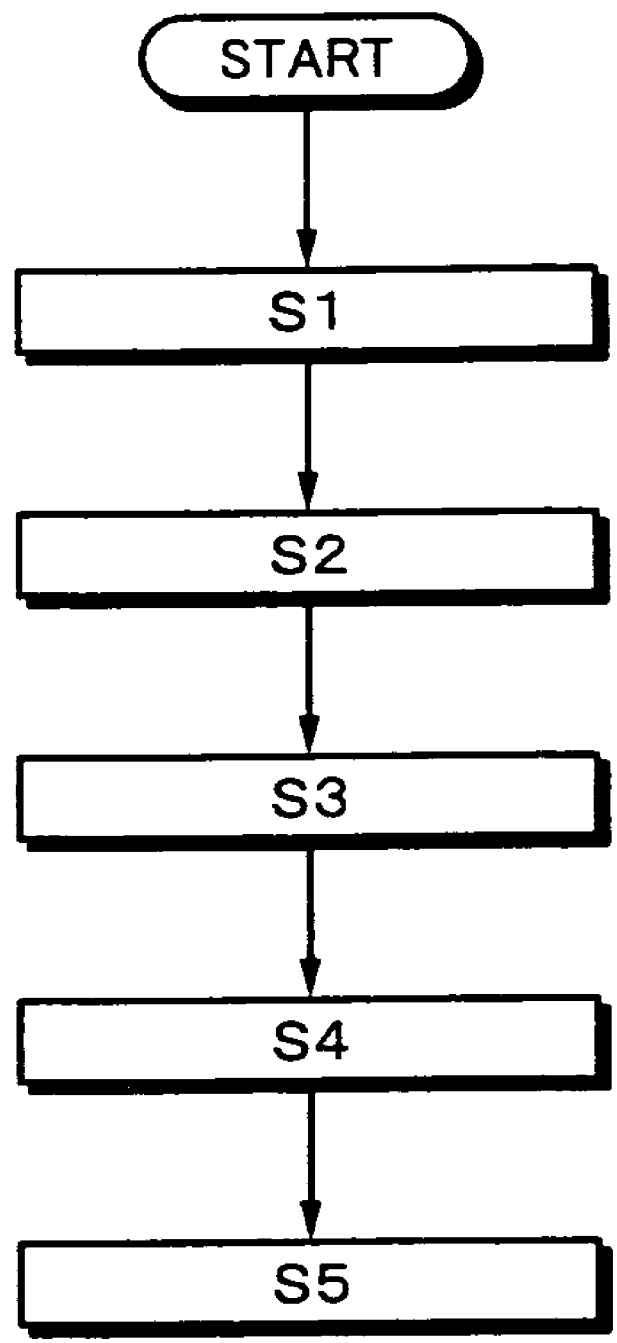
FIG. 13 is a flowchart for use in explanation of a recording process to which the invention is applied.

FIG. 13 is a flowchart showing an example of the recording method to which the invention is applied. First, the data corresponding to one block obtained after the CIRC process is arranged so that the predetermined data pattern is recorded into the predetermined portion on the disc (step S1).

Figure 14:
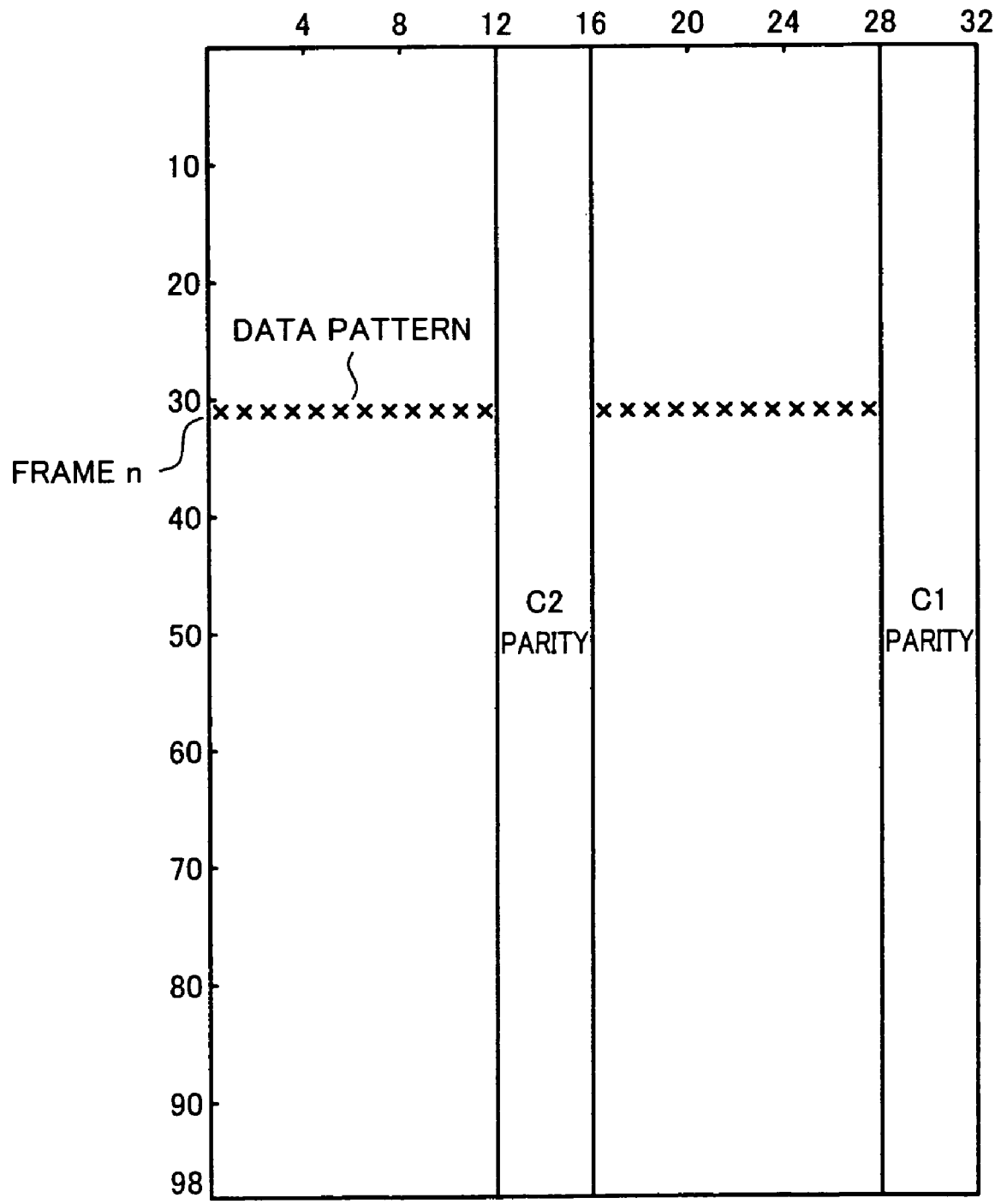
FIG. 14 is a schematic diagram for use in explanation of a data pattern arranged in one block of the CD-ROM after the CIRC process.

For example, as shown in FIG. 14, the data of one block obtained after the interleaving of the CIRC is presumed. The data according to the data pattern is arranged to the predetermined position in the data of one block. In FIG. 14, the corresponding data to form the predetermined data pattern is arranged to a portion of a frame n.

After the data corresponding to one block obtained after the interleaving is arranged so that the predetermined data pattern is recorded into the predetermined portion on the disc, by tracing back the encoding step of the CIRC, the layout of the recording data of one block before the interleaving is obtained (step S2).

Figure 15:
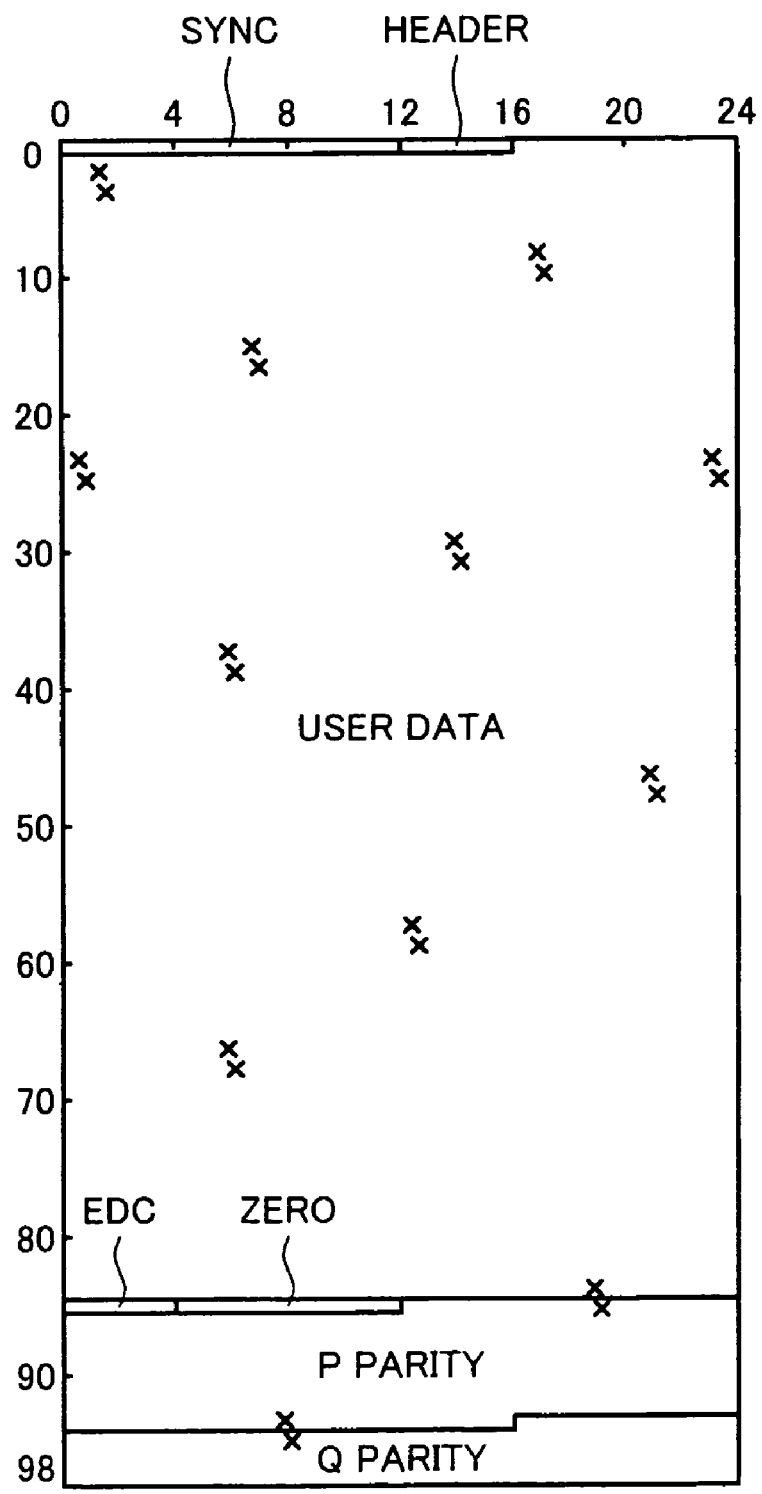
FIG. 15 is a schematic diagram for use in explanation of a data pattern arranged in one block of the CD-ROM before the CIRC process.

That is, to the data arranged as shown in FIG. 14, by tracing back the encoding step of the CIRC, the layout of the recording data of one block before the CIRC process shown in FIG. 15 is obtained. Specifically speaking, the delaying process corresponding to the 1-symbol delay circuit 21, the deinterleaving process corresponding to the deinterleaving circuits 23, and the 2-symbol delay and the descrambling process corresponding to the 2-symbol delay/descrambling circuit 25 shown in FIGS. 4 and 5 are executed. Thus, as shown in FIG. 15, the layout of the recording data of one block before the CIRC process for allowing the predetermined data pattern to be recorded into the predetermined portion is obtained.

After the layout of the recording data of one block before the CIRC process is obtained from the data of one block arranged as shown in FIG. 14, the data corresponding to the predetermined data pattern is distributed to each frame in one block as shown by marks x in FIG. 15.

After the recording data of one block before the CIRC process is arranged, the error correction encoding process of the CD-ROM is executed (step S3).

If the position of the parity coincides with the data corresponding to the predetermined data pattern here, the parity is set to the value of the data corresponding to the predetermined data pattern and the value of a part of the user data of the encoding sequence to form the parity is changed so as to satisfy a function of the error correction code. It is, however, assumed that if the data corresponding to the predetermined data pattern exists in the user data of the encoding sequence to form the parity, the value of the data corresponding to the predetermined data pattern is not changed.

Figure 16:
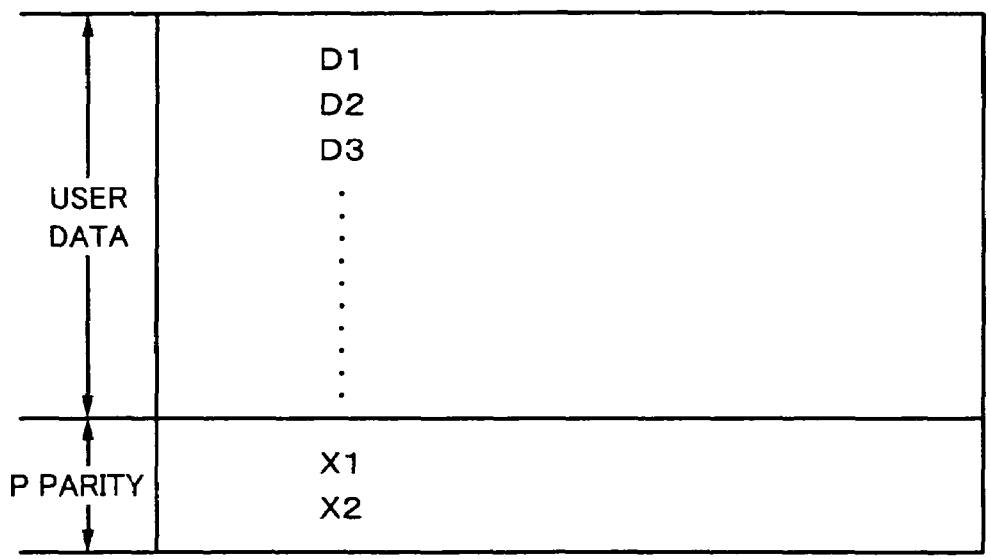
FIG. 16 is a schematic diagram for use in explanation of an error correcting process to which the invention is applied.
Figure 17:
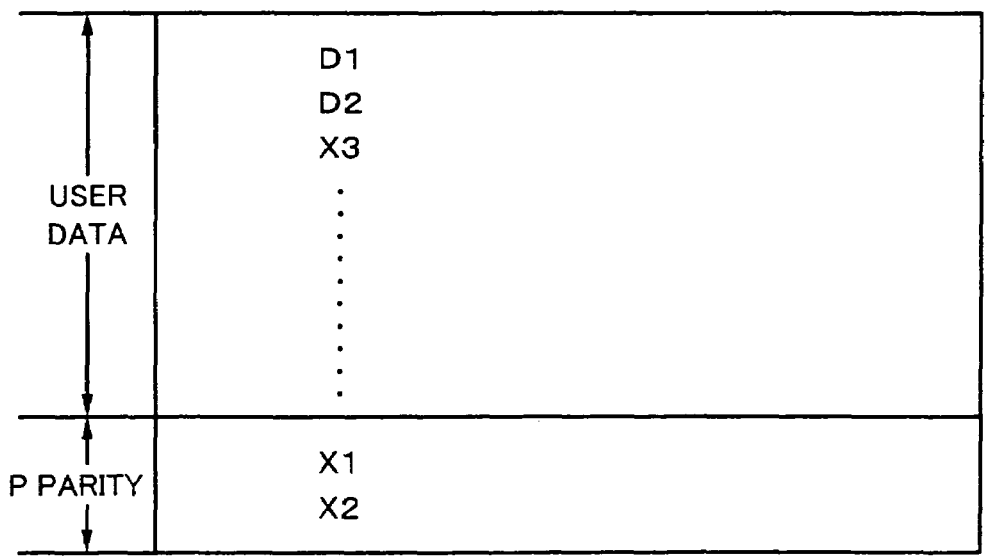
FIG. 17 is a schematic diagram for use in explanation of the error correcting process to which the invention is applied.

For example, if data X1 and X2 corresponding to the predetermined data pattern come to the portion of the parity of the P sequence as shown in FIG. 16, it is assumed that the parity of the error encoding sequence is X1 and X2 and user data D1, D2, D3, . . . of the error encoding sequence is changed so that the parity is set to X1 and X2. However, if data X3 corresponding to the predetermined data pattern exists in the user data as shown in FIG. 17, the data X3 is not changed. This is true of the Q sequence.

In the case of the Reed-Solomon Code, it is sufficient that the data string including the parities satisfies a predetermined function. Therefore, if the parity is not changed, by changing a part of the data string so as to satisfy the function of the error correction code, the error correcting process is not obstructed.

In the ordinary recording, if the user data is changed, there is a risk of occurrence of a problem. However, if the portion where the predetermined data pattern is recorded is predetermined, by processing on the assumption that there is a possibility that the user data of such a portion has been changed, no problem will occur. For example, it is sufficient that the user data of such a portion is not used. Special data can be also recorded in this portion.

After the error correction encoding of the CD-ROM is executed as mentioned above, the encoding of the CIRC is executed to the recording data of one block (step S4). When the encoding process of the CIRC is executed, the data corresponding to the predetermined data pattern is returned to the position shown in FIG. 14. The error correction encoding process of the CD-ROM mode 1 is executed to the data so as not to cause a problem in the error correcting process.

The data which was interleaved by the CIRC and error correction encoded as mentioned above is EFM modulated and recorded onto the disc (step S5). Naturally, the data of the subcode is added and the sync data pattern is added to each frame in this instance. Merging bits for DC component suppression are added to an interval between the channel bits of 14 bits and the channel bits of 14 bits. Those constructions are similar to those in the ordinary CD and CD-ROM.

As mentioned above, according to the recording method to which the invention is applied, the data corresponding to one block obtained after the interleaving by the CIRC was performed is arranged so that the predetermined data pattern is recorded into the predetermined portion on the disc, and the encoding step of the CIRC is traced back, thereby obtaining the layout of the recording data of one block before the CIRC process and executing the error correcting process of the CD-ROM. If the position of the parity coincides with the position of the data to form the predetermined data pattern, the parity is set to the value of the data corresponding to the predetermined data pattern, and a part of the value of the user data of the encoding sequence which forms the parity is changed. After the error correction encoding of the CD-ROM is executed as mentioned above, the encoding of the CIRC is executed to the recording data of one block and the encoded data is EFM modulated and recorded onto the disc. Thus, the predetermined data pattern can be recorded into the predetermined portion and the error correction encoding process is not influenced.

By setting the predetermined data pattern to, for example, a data pattern in which a DSV (Digital Sum Variation) diverges, the disc can be identified and the copy can be prevented by using such a data pattern. An example in which the data pattern in which a DSV diverges is recorded will be described hereinbelow. Naturally, the data pattern to be recorded is not limited to the data pattern in which a DSV diverges.

In the CD, the EFM modulation is used. A conversion table of the EFM is as shown in FIG. 6. In the EFM modulation, the merging bits are added so as to suppress the DC component. However, the merging bits are unconditionally determined in dependence on the data pattern and there is a data pattern in which a DSV increases. By using such a data pattern, the disc can be identified and the copy can be prevented.

That is, FIG. 6 shows a conversion table for executing a process to convert the data bits (properly, called a data symbol) of 8 bits into the channel bits (properly, called a code symbol) of 14 bits. In FIG. 6, the data bits are shown by a hexadecimal notation (00 to FF), a decimal notation (0 to 255), and a binary notation. "1" in 14 bits of the code symbol indicates the position where the value is inverted. Since the data symbol consists of 8 bits, 256 data patterns of the code symbol exist. All of the code symbols of 14 bits satisfy a rule of the EFM (hereinafter, properly referred to as run length limit conditions) in which the minimum time width (time width in which the number of 0 between 1 and 1 of the recording signal is minimum) Tmin is equal to 3T and a maximum time width (time width in which the number of 0 between 1 and 1 of the recording signal is maximum) Tmax is equal to 11T.

Also in the case of connecting the code symbols of 14 bits, the merging bits are necessary to satisfy the run length limit conditions of Tmin=3T and Tmax=11T mentioned above. Four kinds of data patterns (000), (001), (010), and (100) are prepared as merging bits. An example in which the merging bits are used to connect the code symbols of 14 bits will be described with reference to FIGS. 18A to 18D.

Figures 18A, 18B, 18C, 18D:
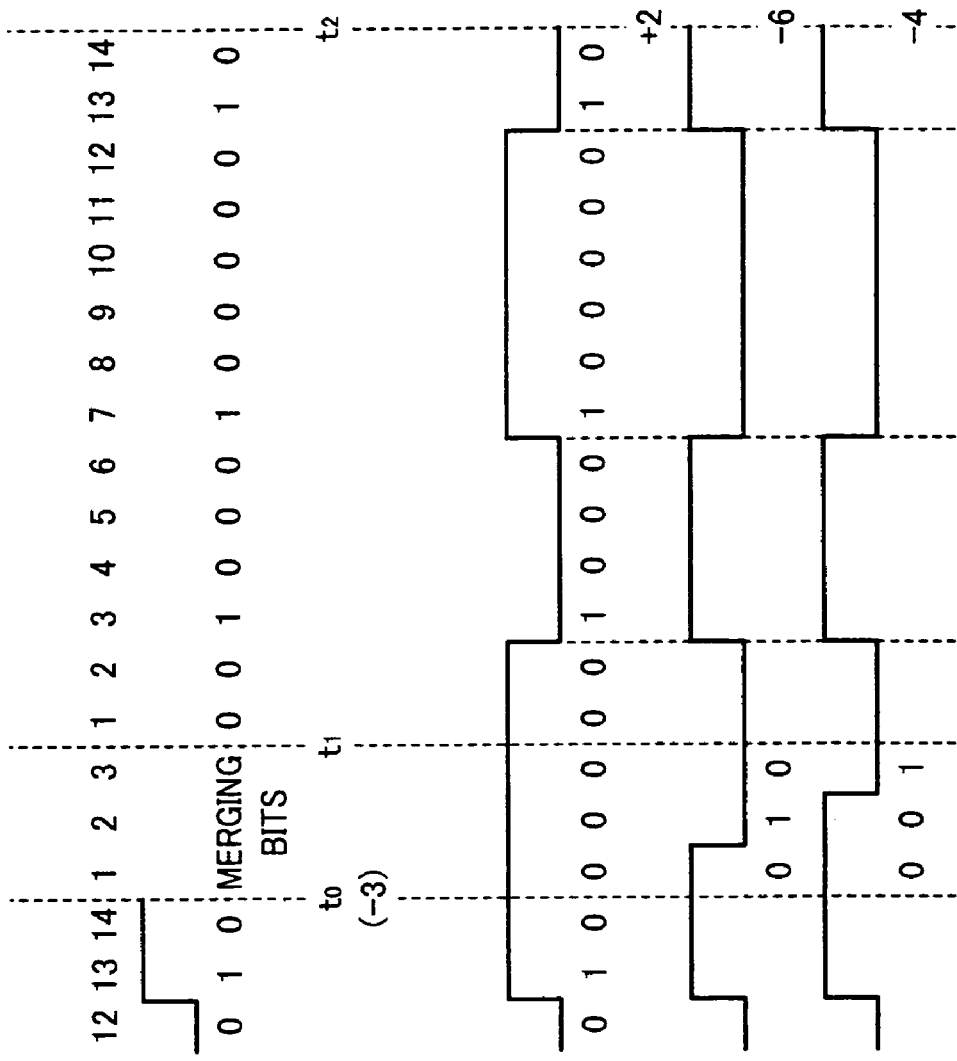
FIGS. 18A to 18D are schematic diagrams for use in explanation of a selecting process of merging bits.

As shown in FIG. 18A, a case where the previous 14-bit data pattern ends with (010) and the next data symbol is (01110111) (77 in the hexadecimal notation; 119 in the decimal notation) will be considered. This data symbol is converted into a 14-bit data pattern (00100010000010). It is assumed that the previous 14-bit data pattern ends at timing t0, the next 14-bit data pattern starts at timing t1 after the interval of the merging bits, and the next 14-bit data pattern ends at timing t2.

If (100) is applied as four kinds of merging bits mentioned above, since the condition of Tmin=3T is not satisfied, these merging bits are not used. The subsequent three kinds of merging bits can be used. The merging bits which reduce the DSV are selected as merging bits which are actually used among the three kinds of merging bits. The DSV is obtained by giving +1 if a waveform is at the high level and −1 if the waveform is at the low level. For example, it is assumed that the DSV at timing t0 is equal to (−3).

FIG. 18B shows the waveform in the case of using (000) as merging bits. Since the DSV in a period of time (t0-t1) is equal to +3 and the DSV in a period of time (t1-t2) is equal to +2, the DSV at timing t2 is equal to (−3+3+2=+2). FIG. 18C shows the waveform in the case of using (010) as merging bits. Since the DSV in the period of time (t0-t1) is equal to −1 and the DSV in the period of time (t1-t2) is equal to −2, the DSV at timing t2 is equal to (−3−1−2=−6). FIG. 18D shows the waveform in the case of using (001) as merging bits. Since the DSV in the period of time (t0-t1) is equal to +1 and the DSV in the period of time (t1-t2) is equal to −2, the DSV at timing t2 is equal to (−3+1−2=−4). Eventually, the merging bits (000) in which a DSV at timing t2 is closest to 0 are selected.

As mentioned above, although the DSV can be reduced by selecting the merging bits according to the ordinary pattern, in a certain special pattern, the merging bits are unconditionally determined and the DSV increases. FIG. 19 shows such a special data pattern.

Figure 20:
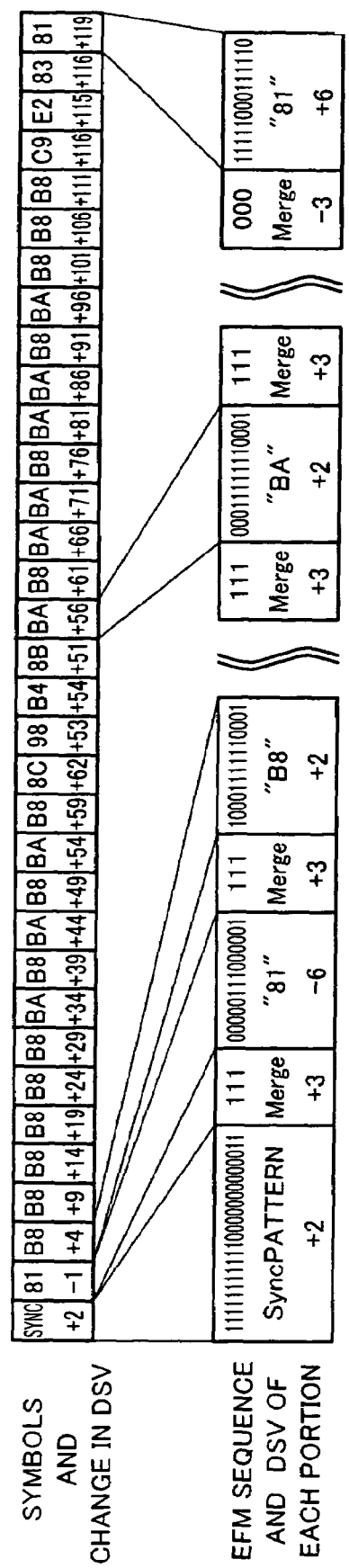
FIG. 20 is a schematic diagram for use in explanation of a process of the pattern in which a DSV increases.

In the data patterns shown in FIG. 19, (81), (83), (8C), (98), (B8), (BA), (C9), (E2), etc. appear as data symbols. In all of those data symbols, in the 14-bit code symbol obtained after the conversion was performed by the EFM conversion table, the head portion is equal to 0T (this means that the level immediately changes) or 1T (this means that the level changes after 1T) and only 1T exists in an end portion. FIG. 20 shows a change in DSV at the time when, for example, the data of the first row in FIG. 19 is EFM modulated by the ordinary encoder (EFM modulation) and a partial EFM sequence. In FIG. 20, in order to express the waveform of the EFM sequence, "1" indicates the high level and "0" shows the low level.

FIG. 20 will be explained further in detail. It is assumed that a frame sync signal is set so that the waveform of 2T follows the waveform of 11T and the inverted waveform of 11T. In the portion of the frame sync signal, DSV=+2. The data symbol of (81) corresponding to the subcode is converted into a code symbol of (10000100100001) in accordance with the conversion table. According to this code symbol, the level immediately changes at the head and the DSV of the code symbol itself is equal to −6. (000) is selected as merging bits which satisfy the run length limit conditions in accordance with the selecting rule of the merging bits. That is, since other merging bits (100), (010), and (001) cannot satisfy Tmin=3T, (000) is unconditionally selected. Thus, in the portion of the merging bits, the inversion of the level does not occur and the DSV here is equal to +3. The DSV at the end of the code symbol obtained by converting (81) is equal to +2+3−6=−1.

The next data symbol (B8) is converted into a code symbol of (01001000001001) in accordance with the conversion table. The DSV of the code symbol itself is equal to +2. (000) is unconditionally selected as merging bits which satisfy the run length limit conditions in accordance with the selecting rule of the merging bits. In the result, in the portion of the merging bits, the inversion of the level does not occur and the DSV here is equal to +3. The DSV at the end of the code symbol obtained by converting (B8) is equal to +2+3−6+3=+4.

The data symbol (BA) is converted into a code symbol of (10010000001001) in accordance with the conversion table. The DSV of the code symbol itself is equal to +2. (000) is unconditionally selected as merging bits which satisfy the run length limit conditions in accordance with the selecting rule of the merging bits. In the result, in the portion of the merging bits, the inversion of the level does not occur and the DSV here is equal to +3.

As mentioned above, in the foregoing specific data pattern, since there is no room to select the merging bits, the function of the control to converge the DSV is not effected. As shown in FIG. 20, the DSV increases by 100 or more with respect to one frame and continues to increase so long as the data data pattern continues.

According to the CD formed by using the recording signal in which the foregoing specific data data pattern has been encoded, since the DSV remarkably increases, the original data cannot be correctly read out. This means that even if the original CD is reproduced and the reproduction data is encoded by the conventional encoder and recorded onto a medium such as a CD-R or the like, the reproduction data of the medium cannot be correctly read out, and the copy prevention can be accomplished.

On the other hand, for example, if the run length limitation is loosened, there is a room for selection of the merging bits and the increase in DSV can be prevented.

Figure 21:
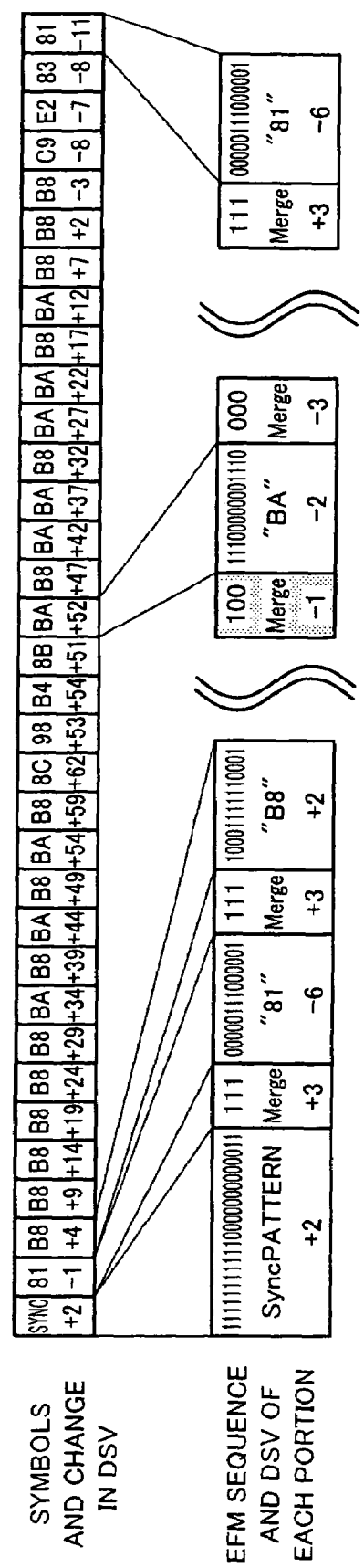
FIG. 21 is a schematic diagram for use in explanation of a process of the pattern in which a DSV increases.

FIG. 21 shows a change in DSV at the time when, for example, the data of the first row in FIG. 19 is EFM modulated and a partial EFM sequence in a manner similar to FIG. 20. For example, it is assumed that in the case where the data symbol is (BA) and the run length limit conditions are the same, the DSV is equal to +56 in the case where the specific data data pattern is detected. In this case, in the ordinary encoding, as described with reference to FIG. 20, since the inversion occurs at the end of the previous 14-bit code symbol (8B), there is only 1T, and the inversion occurs at the beginning of the next code symbol (BA). Therefore, only the merging bits of (000) can be selected and the DSV cannot be decreased. On the other hand, if the run length limitation is loosened to thereby permit Tmin'=2T, not only the merging bits of (000) but also the merging bits of (010) can be selected. That is, in this case, in the four channel bits in total of the last channel bit of previous (8B) and the merging bits, a waveform of 2T (expressed by 11) and a waveform of 2T (expressed by 00) occur. Thus, the DSV does not increase.

For example, in the original disc, if the run length limitation is loosened and the special pattern is recorded onto the disc, although the DSV does not increase in the original disc, in the case of the copied disc, if the EFM modulation is performed by the ordinary encoder, the DSV increases. Thus, whether the disc is the original disc or the copied disc can be discriminated. Consequently, the copy can be prevented.

Figure 22:
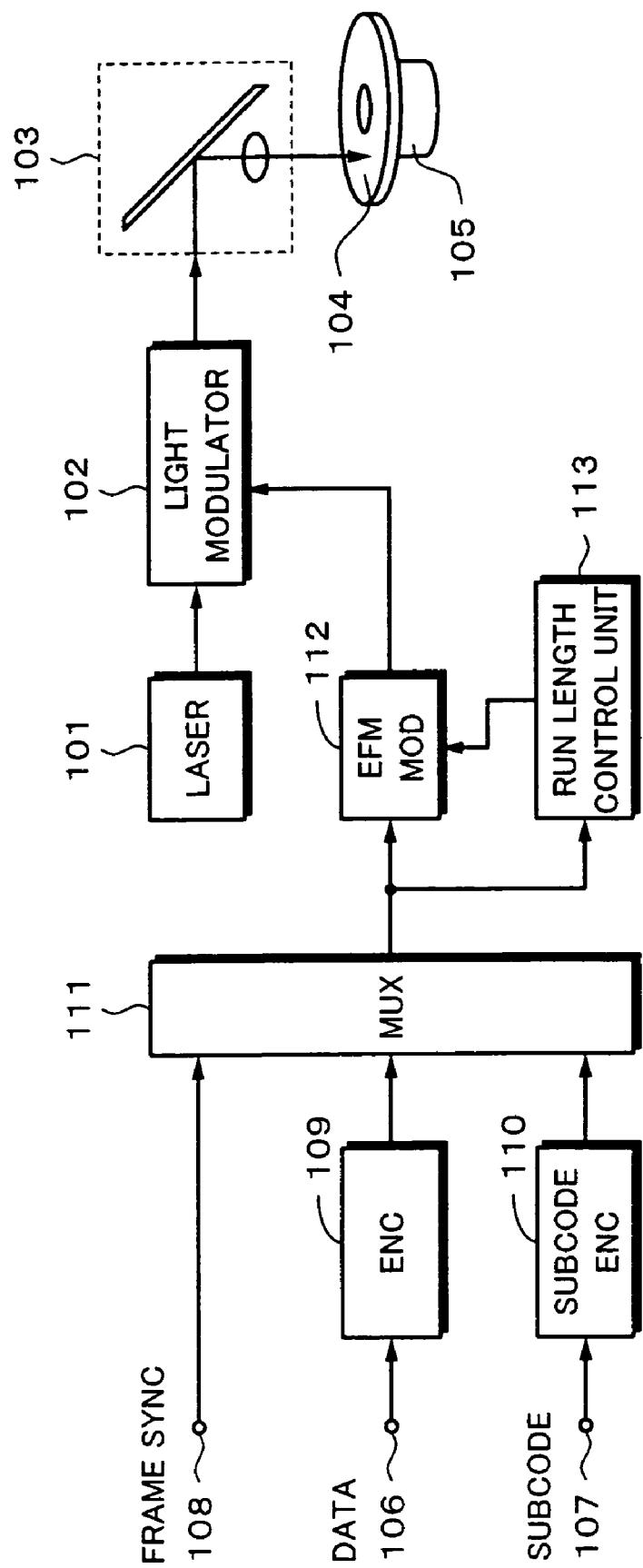
FIG. 22 is a block diagram of an example of a recording apparatus.

FIG. 22 shows an example of a construction of a mastering apparatus for forming a data recording medium serving as a master disc of the CD-ROM. The mastering apparatus comprises: a laser 101 such as gas laser like an Ar ion laser, a He—Cd laser, or a Kr ion laser or semiconductor laser; a light modulator 102 of an acousto-optical effect type or an electro-optical type for modulating a laser beam emitted from the laser 101; and an optical pickup 103 serving as recording means having an objective lens and the like for converging the laser beam which passed through the light modulator 102 and irradiating the converged laser beam onto a photoresist surface of a disk-shaped glass master disc 104 coated with a photoresist as a photosensitive material.

The light modulator 102 modulates the laser beam from the laser 101 in accordance with the recording signal. The mastering apparatus irradiates the modulated laser beam onto the glass master disc 104, thereby forming a master on which the data has been recorded. A servo unit (not shown) for controlling the optical pickup 103 so as to keep a distance between the optical pickup 103 and the glass master disc 104 to a predetermined value, controlling tracking, and controlling the rotating operation of a spindle motor 105 is provided. The glass master disc 104 is rotated by the spindle motor 105.

The recording signal from an EFM modulator 112 is supplied to the light modulator 102. Main digital data to be recorded is supplied from an input terminal 106. The subcodes of the channels P to W based on the existing CD standard are supplied from an input terminal 107. Further, a frame sync is supplied from an input terminal 108.

The main digital data is supplied to an encoder 109 and the error correcting process of the CD-ROM and the error correcting process of the CIRC are executed. The special pattern in which a DSV increases is recorded onto the disc. The foregoing recording method is used when such a special pattern is recorded.

That is,
(1) The data corresponding to one block obtained after the CIRC process is arranged so that the predetermined data pattern is recorded into the predetermined portion on the disc.
(2) By tracing back the encoding step of the CIRC, the layout of the recording data of one block before the CIRC process for allowing the predetermined data pattern to be recorded into the predetermined portion is obtained.
(3) The recording data of one block before the CIRC process for allowing the predetermined data pattern to be recorded is arranged into the predetermined portion and the error correcting process of the CD-ROM is executed. If the position of the parity coincides with the data to form the predetermined data pattern, the parity is set to the value of the data to form the predetermined data pattern and the value of the user data of the encoding sequence to form the parity is changed. However, if the data to form the predetermined data pattern exists in the user data of the encoding sequence, the value of the data to form the predetermined data pattern is not changed.
(4) After the error correction encoding of the CD-ROM is executed, the encoding of the CIRC is executed to the recording data of one block.

An output of the encoder 109, an output of a subcode encoder 110, and the frame sync are supplied to a multiplexer 111 and arranged in predetermined order. Output data of the multiplexer 111 is supplied to the EFM modulator 112. The symbol of 8 bits is converted into data of 14 channel bits in accordance with the conversion table. The output of the multiplexer 111 is supplied to a run length control unit 113. The run length control unit 113 makes control of the run length of an EFM modulation output in the EFM modulator 112. An output of the EFM modulator 112 is supplied to the light modulator 102.

The recording signal in the EFM frame format of the CD is generated from the EFM modulator 112. The recording signal is supplied to the light modulator 102. The photoresist on the glass master disc 104 is exposed by the modulated laser beam from the light modulator 102. A metal master is formed by developing the glass master disc 104 which was recorded as mentioned above. Subsequently, a mother disc is formed from the metal master. Further, a stamper is formed from the mother disc. An optical disc is formed by using the stamper by a method such as compression molding, injection molding, or the like.

In FIG. 22, the run length control unit 113 enables the EFM modulation to be executed so as to prevent the increase in DSV even in the case of the data data pattern in which a DSV increases to the level which causes an error in the data reading. That is, the run length control unit 113 detects the case where the DSV increases to the level which causes an error in the data reading and controls a merging bit selecting unit in the EFM modulator 112 so as to loosen the run length limit conditions of the EFM. For example, Tmin=3 and Tmax=11 are loosened to Tmin'=2 and Tmax'=12. Only one of Tmin and Tmax of the run length limit conditions can be changed and they can be also set to Tmin'=1 and Tmax'=13.

The run length control unit 113 previously reads out the data to be EFM modulated and detects a special data data pattern which cannot suppress the divergence of the DSV in the ordinary EFM modulation. The special data data pattern can be detected by a method of detecting the special data data pattern itself by a method of data pattern mapping or the like, a method of comparing an absolute value of the DSV with a threshold value and detecting a case where the absolute value of the DSV exceeds the threshold value, a method of detecting a case where a state where the absolute value of the DSV exceeds the threshold value continues the number of times corresponding to a predetermined number of symbols, or the like. In a state where the special data data pattern is not detected, the run length control unit 113 controls so that the EFM modulator 112 selects the merging bits which keeps the run length limit conditions of Tmin=3T and Tmax=1T. When the special data data pattern is detected, the run length control unit 113 loosens the run length limit conditions to, for example, Tmin'=2T and Tmax'=12T. Thus, a room to select the merging bits is produced and the merging bits which reduce the DSV can be selected.

Figure 23:
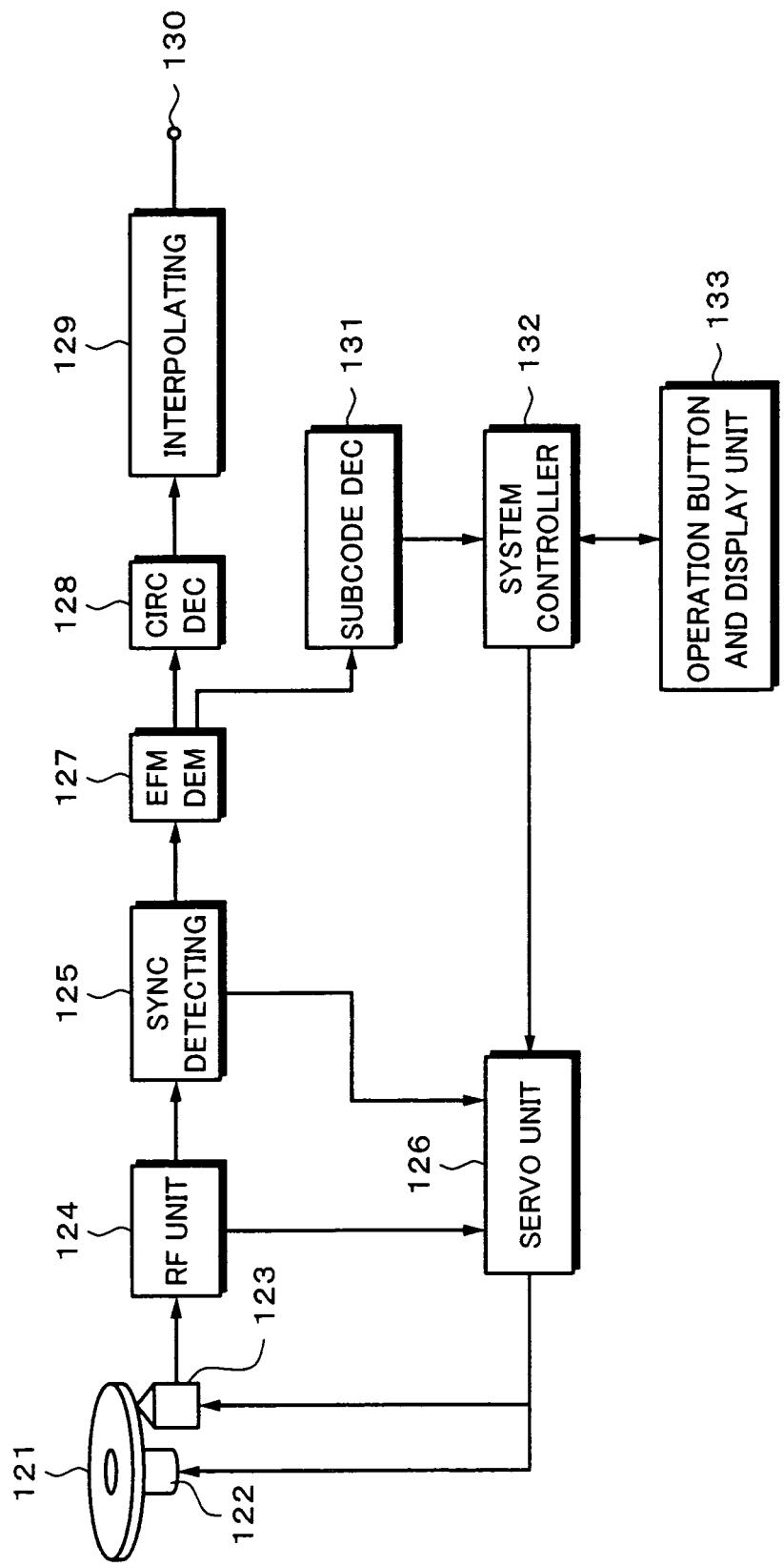
FIG. 23 is a block diagram of an example of a reproducing apparatus.

FIG. 23 shows an example of a construction of a reproducing apparatus for reproducing the optical disc formed by the mastering and stamping mentioned above. Although the reproducing apparatus has substantially the same construction of the existing player or drive, it will be explained hereinbelow for reference of understanding of the invention. In FIG. 23, reference numeral 121 denotes a disc formed by the mastering and stamping steps; 122 a spindle motor to rotate the disc 121; and 123 an optical pickup to reproduce a signal recorded on the disc 121. The optical pickup 123 comprises: an optical system such as semiconductor laser for irradiating a laser beam onto the disc 121, objective lens, and the like; a detector for detecting the return light from the disc 121; a focusing and tracking mechanism; and the like. Further, the optical pickup 123 is moved in the radial direction of the disc 121 by a sled mechanism (not shown).

Output signals from, for example, 4-split detectors of the optical pickup 123 are supplied to an RF unit 124. The RF unit 124 arithmetically operates the output signals of the 4-split detectors, thereby forming a reproduction (RF) signal, a focusing error signal, and a tracking error signal. The reproduction signal is supplied to a frame sync detecting unit 125. The frame sync detecting unit 125 detects a frame sync added to the head of each EFM frame. The detected frame syncs, focusing error signal, and tracking error signal are supplied to a servo unit 126. The servo unit 126 controls the rotating operation of the spindle motor 122 and a focusing servo and a tracking servo of the optical pickup 123 on the basis of a reproducing clock of the RF signal.

Main data which is outputted from the frame sync detecting unit 125 is supplied to an EFM demodulator 127 and subjected to an EFM demodulating process. The main digital data from the EFM demodulator 127 is supplied to a decoder 128 and subjected to an error correcting process of the CIRC and error correcting process process of the CD-ROM mode 1. Further, the data is interpolated by an interpolating circuit 129 and extracted as reproduction data to an output terminal 130. Subcode data from the EFM demodulator 127 is supplied to a system controller 132.

The system controller 132 is constructed by a microcomputer and controls the operation of the whole reproducing apparatus. An operation button and display unit 133 is provided in association with the system controller 132. The system controller 132 controls the servo unit 126 in order to access a desired position on the disc 121.

The invention can be also similarly applied to a case where the parity portion of the CIRC is used as a predetermined data pattern.

According to the invention, first, the data corresponding to one block obtained after the process of the CIRC is arranged so that the predetermined data pattern is recorded in the predetermined portion on the disc. By tracing back the encoding step of the CIRC, the layout of the recording data of one block before the CIRC process for allowing the predetermined data pattern to be recorded in the predetermined portion is obtained, and the error correcting process of the CD-ROM is executed. If the position of the parity coincides with the data corresponding to the predetermined data pattern here, the parity is set to the value of the data corresponding to the predetermined data pattern, a part of the value of the user data of the encoding sequence which forms the parity is changed so as to satisfy the function of the error correction code. After the error correction encoding of the CD-ROM is executed as mentioned above, the encoding of the CIRC is executed to the recording data of one block and the encoded data is EFM modulated and recorded onto the disc.

According to the invention as mentioned above, if the position of the parity coincides with the data corresponding to the predetermined data pattern, the parity is set to the value of the data which forms the predetermined data pattern, and the value of the user data of the encoding sequence which forms the parity is changed so as to satisfy the function of the error correction code. Therefore, the predetermined data pattern can be recorded into the predetermined portion and the error correction encoding process is not influenced.

The invention claimed is:

1. A data recording method whereby an error correction encoding process by a first error correction encoding process is executed to data of a predetermined block, further, an error correction encoding process by a second error correction encoding process is executed, and the data is recorded onto a recording medium, comprising the steps of:

arranging data corresponding to a predetermined data pattern onto a block obtained after said second error correction encoding process so that the predetermined data pattern is recorded into a predetermined portion on said recording medium;

arranging the data corresponding to said predetermined data pattern arranged on the block obtained after said second error correction encoding process onto a block before said second error correction encoding process by tracing back the processing step of said second error correction encoding process;

executing said first error correction encoding process to the data arranged on the block before said second error correction encoding process;

in said first error correction encoding processing step, if a position of a parity coincides with a position of the data corresponding to said predetermined data pattern, said parity is set to a value of the data corresponding to said predetermined data pattern, and a value of a part of data of an encoding sequence for forming said parity is changed so as to satisfy a function of an error correction code;

executing said second error correction encoding process to the data of the block to which said first error correction encoding process has been executed; and recording the data to which said first error correction encoding process has been executed and, further, said second error correction encoding process has been executed onto said recording medium.

2. A data recording method according to claim 1, wherein said first error correction encoding process is an error correction encoding process of a CD-ROM mode 1 and said second error correction encoding process is a Cross-Interleave Reed-Solomon Code.

3. A data recording method according to claim 1, wherein said predetermined data pattern is a data pattern to identify a disc.

4. A data recording method according to claim 1, wherein said predetermined data pattern is a data pattern to limit a copy.

5. A data recording method according to claim 1, wherein said predetermined data pattern is a data pattern in which a Digital Sum Variation increases.

6. A data recording apparatus in which an error correction encoding process by a first error correction encoding process is executed to data of a predetermined block, further, an error correction encoding process by a second error correction encoding process is executed, and the data is recorded onto a recording medium, comprising:

means for arranging data corresponding to a predetermined data pattern onto a block obtained after said second error correction encoding process so that the predetermined data pattern is recorded into a predetermined portion on said disc;

means for arranging the data corresponding to said predetermined data pattern arranged on the block obtained after said second error correction encoding process onto a block before said second error correction encoding process by tracing back a processing step of said second error correction encoding process;

means for executing said first error correction encoding process to the data arranged on the block before said second error correction encoding process;

in said means for executing said first error correction encoding process, if a position of a parity coincides with a position of the data corresponding to said predetermined data pattern, said parity is set to a value of the data corresponding to said predetermined data pattern, and a value of a part of data of an encoding sequence for forming said parity is changed so as to satisfy a function of an error correction code;

means for executing said second error correction encoding process to the data of the block to which said first error correction encoding process has been executed; and means for recording the data to which said first error correction encoding process has been executed and, further, said second error correction encoding process has been executed onto said recording medium.

7. A data recording apparatus according to claim 6, wherein said first error correction encoding process is an error correction encoding process of a CD-ROM mode 1 and said second error correction encoding process is a Cross-Interleave Reed-Solomon Code.

8. A data recording apparatus according to claim 6, wherein said predetermined data pattern is a data pattern to identify a disc.

9. A data recording apparatus according to claim 6, wherein said predetermined data pattern is a data pattern to limit a copy.

10. A data recording apparatus according to claim 6, wherein said predetermined data pattern is a data pattern in which a Digital Sum Variation increases.

* * * * *